(12) United States Patent
Martinez et al.

(10) Patent No.: US 12,525,706 B2
(45) Date of Patent: Jan. 13, 2026

(54) ANTENNA SYSTEM FOR MOBILE DEVICES

(71) Applicant: META PLATFORMS TECHNOLOGIES, LLC, Menlo Park, CA (US)

(72) Inventors: Juan Manuel Martinez, Redmond, WA (US); Yuen Hui Chee, Saratoga, CA (US); Ashutosh Yugesh Shukla, San Diego, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 569 days.

(21) Appl. No.: 17/715,698

(22) Filed: Apr. 7, 2022

(65) Prior Publication Data
US 2023/0327328 A1    Oct. 12, 2023

(51) Int. Cl.
*H01Q 1/27*     (2006.01)
*H01Q 7/00*     (2006.01)
*H01Q 9/16*     (2006.01)

(52) U.S. Cl.
CPC .............. *H01Q 1/273* (2013.01); *H01Q 7/00* (2013.01); *H01Q 9/16* (2013.01)

(58) Field of Classification Search
CPC .......... H01Q 5/314; H01Q 1/243; H01Q 3/26; H01Q 1/12; H01Q 1/273; H01Q 7/00; H01Q 9/16; H03H 2007/386; H03H 7/38; H04B 1/18; H04B 1/0458
See application file for complete search history.

(56) References Cited

U.S. PATENT DOCUMENTS

| | | | |
|---|---|---|---|
| 5,008,864 A | 4/1991 | Yoshitake | |
| 6,212,414 B1 | 4/2001 | Alameh et al. | |
| 2009/0143117 A1* | 6/2009 | Shin | H04B 1/385 455/575.6 |
| 2015/0333403 A1* | 11/2015 | Wong | H01Q 5/20 343/857 |

(Continued)

FOREIGN PATENT DOCUMENTS

| | | | |
|---|---|---|---|
| CN | 209862527 U | * 12/2019 | ........... A44C 5/0007 |
| CN | 111653863 A | 9/2020 | |
| EP | 1014231 A1 | 6/2000 | |

(Continued)

OTHER PUBLICATIONS

International Search Report and Written Opinion for International Application No. PCT/US2023/017727, mailed Jul. 3, 2023, 13 pages.

(Continued)

*Primary Examiner* — Dieu Hien T Duong
(74) *Attorney, Agent, or Firm* — Foley & Lardner LLP

(57) ABSTRACT

The disclosed systems and mobile electronic devices may include a capsule that houses various electronic components. These systems may also include a cradle that is configured to removably couple with the capsule. Still further, these systems may include a strap connected to a first end of the cradle. The strap itself may include at least one antenna. The systems may also include a radio frequency (RF) transparent interconnect that electrically connects the antenna in the strap to at least one of the electronic components in the capsule. Various other methods of manufacturing, systems, and apparatuses are also disclosed.

13 Claims, 30 Drawing Sheets

(56) References Cited

U.S. PATENT DOCUMENTS

2016/0322745 A1    11/2016   Shedletsky et al.
2020/0326787 A1    10/2020   Golko et al.

FOREIGN PATENT DOCUMENTS

JP         08289347 A   * 11/1996
KR       20170047770 A     5/2017

OTHER PUBLICATIONS

International Preliminary Report on Patentability for International Application No. PCT/US2023/017727, mailed Oct. 17, 2024, 11 pages.

* cited by examiner

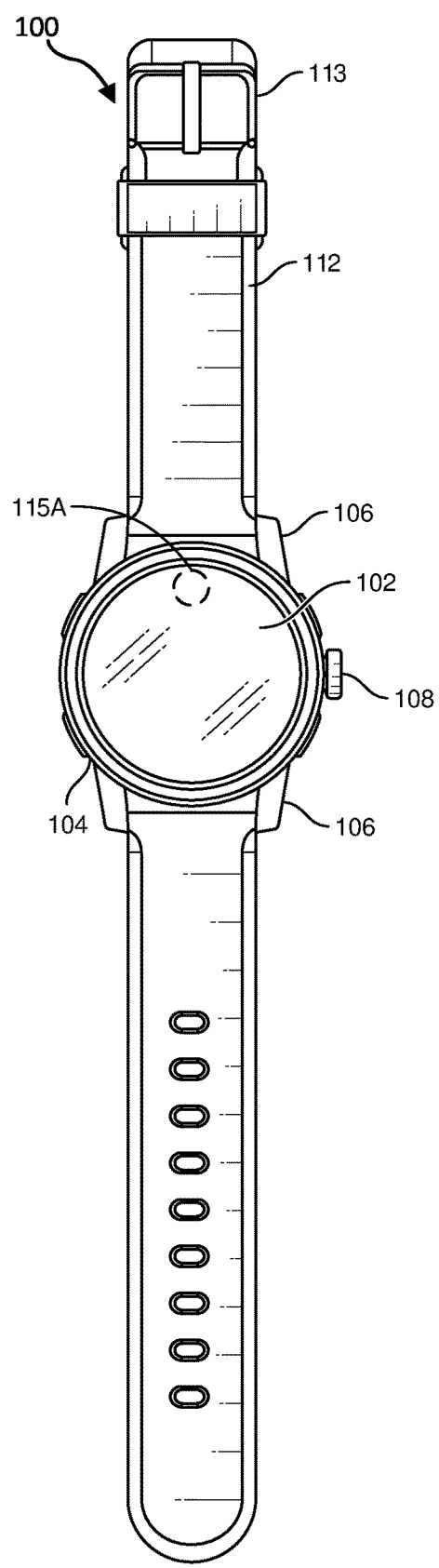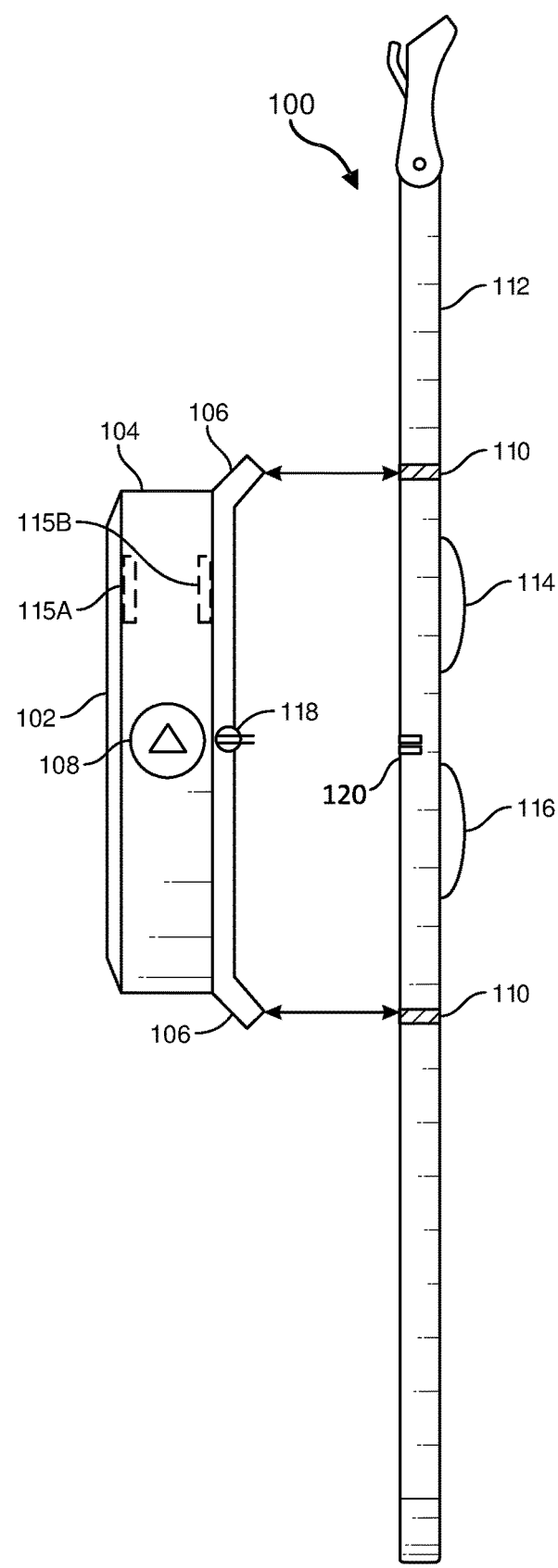
*FIG. 1A*  *FIG. 1B*

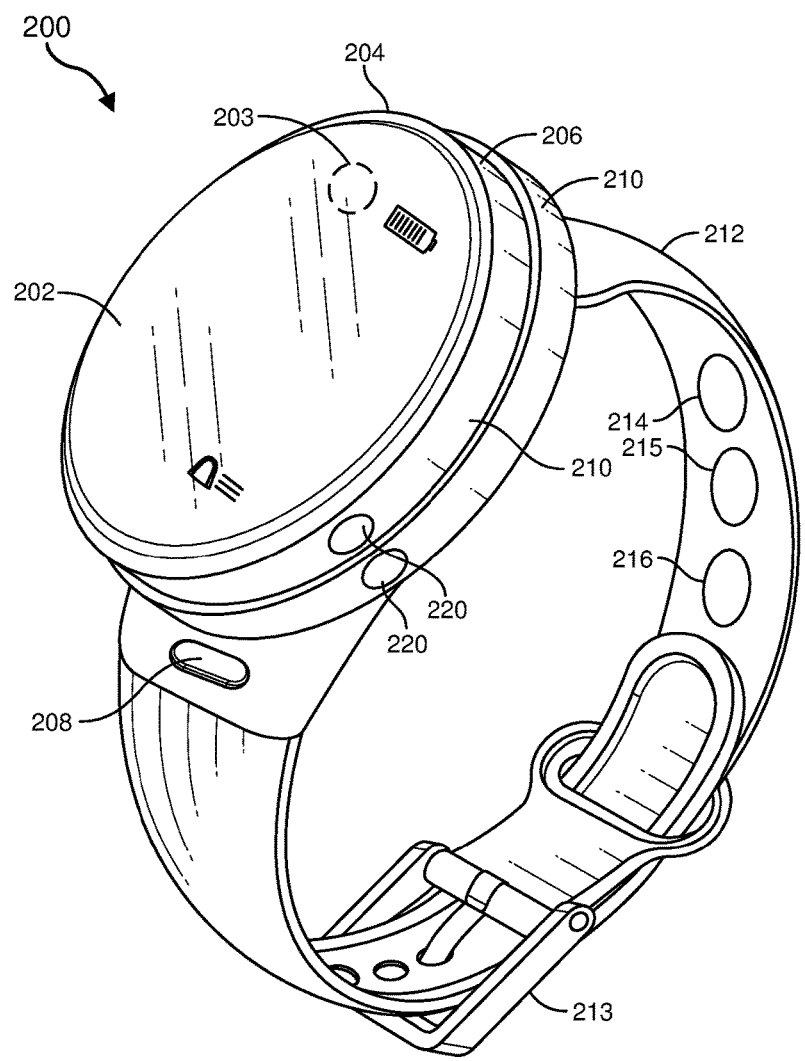
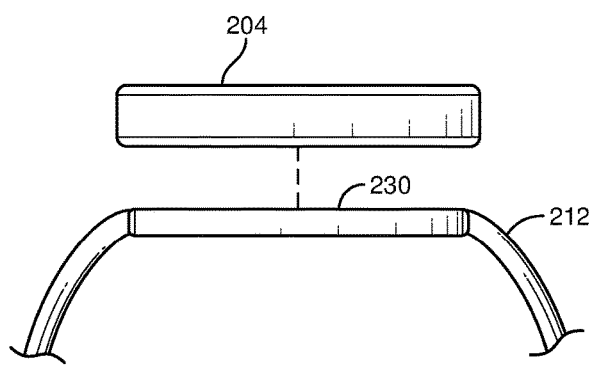
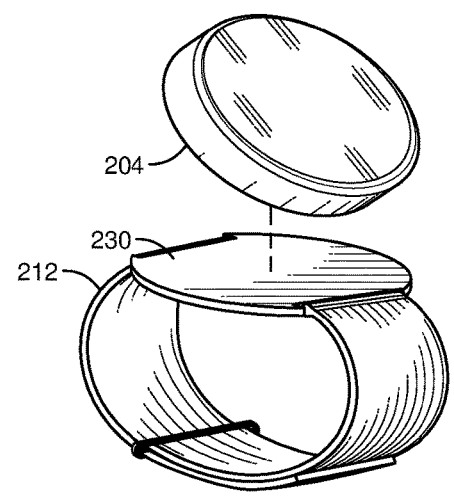
FIG. 2A
FIG. 2B
FIG. 2C

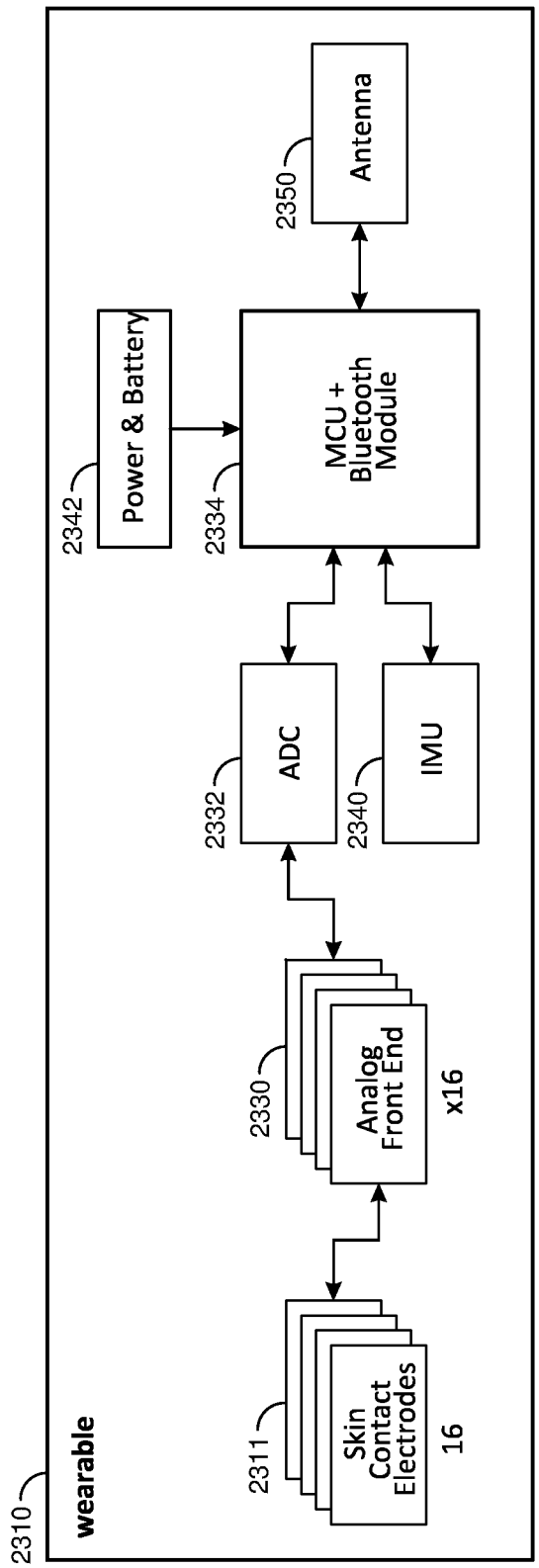 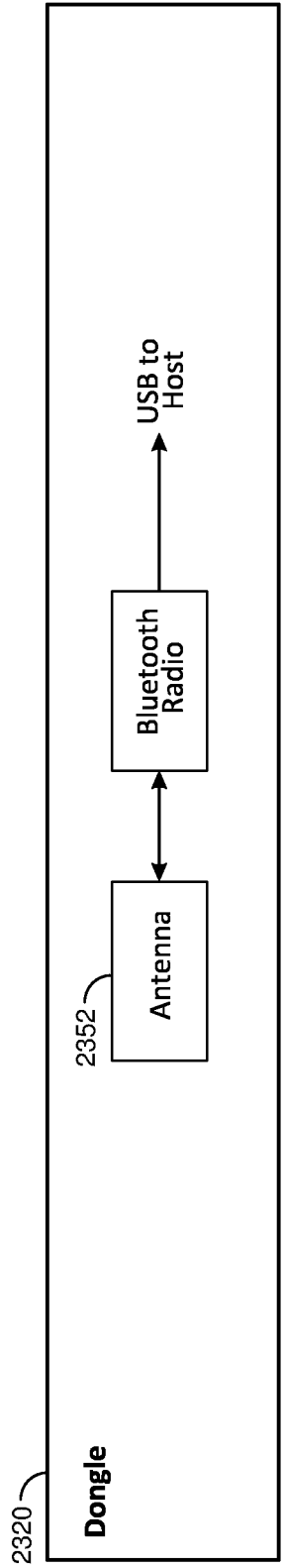
*FIG. 23A*
*FIG. 23B*

ANTENNA SYSTEM FOR MOBILE DEVICES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1A is a plan view of an example wristband system, according to at least one embodiment of the present disclosure.

FIG. 1B is a side view of the example wristband system of FIG. 1A, according to at least one embodiment of the present disclosure.

FIG. 2A is a perspective view of an example wristband system, according to at least one embodiment of the present disclosure.

FIG. 2B is a side view of another example wristband system, according to at least one embodiment of the present disclosure.

FIG. 2C is a perspective view of another example wristband system, according to at least one embodiment of the present disclosure.

FIGS. 23A and 23B are illustrations of an exemplary schematic diagram with internal components of a wearable system.

Figure 3A:
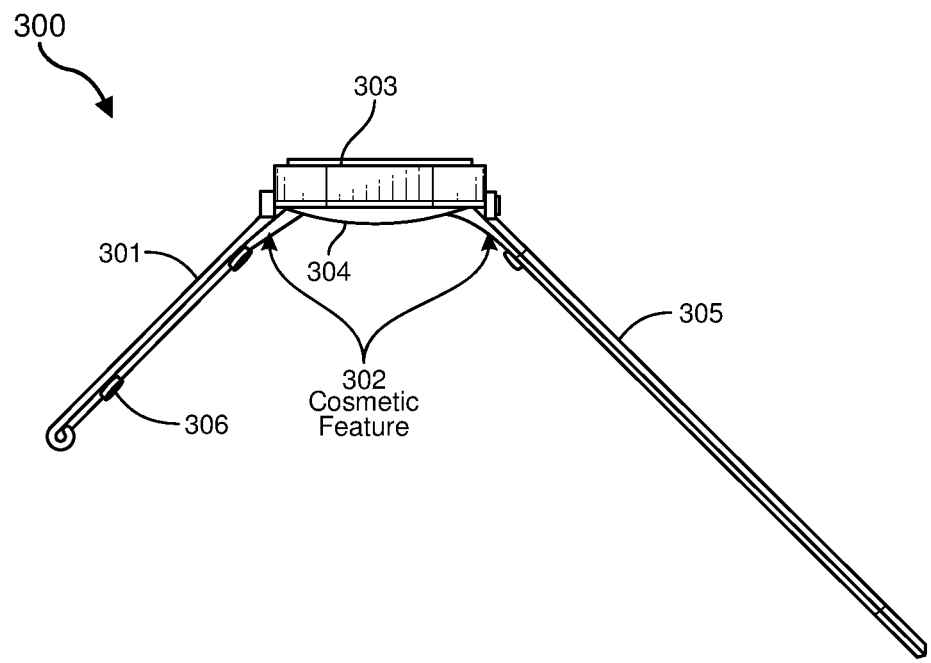
FIG. 3A illustrates a side view of an example wristband system, according to at least one embodiment of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Mobile electronic devices often use many different types of antennas for communication on different frequency bands. For instance, current smartwatches may implement wide- and multi-band long-term evolution (LTE), global positioning system (GPS), wireless fidelity (WiFi), Bluetooth™, near field communication (NFC), 5G or 5G reduced capacity, or other types of antennas. These different types of antennas may provide long- and short-range communications with other electronic devices and with networks such as cellular networks or the internet.

However, as mobile devices become ever smaller, the amount of space available for these different types of antennas may be limited. Moreover, because of the small size, the amount of bandwidth achievable on any given antenna may be limited. Still further, because mobile devices such as smartwatches are often designed with metal enclosures, placing many different types of antennas in different locations where they can receive sufficient operational signal strength may be complicated. In some cases, the size of the mobile device may be increased to accommodate larger antennas. This increased size may, at least in some cases, improve antenna bandwidth and efficiency. However, larger sizes for smartwatches and other mobile devices may be less desirable, as additional weight and bulk in a mobile (especially wearable) device are typically unwanted. Still further, having a metal enclosure may limit how and where different types of antennas are placed and operated within a mobile device.

The antenna systems described herein may provide features to externally link antennas placed in wrist straps to internal electronic components within a mobile device. In some embodiments, a mobile wristband system may include a capsule with various internal electronic components. The capsule may be designed to couple to a cradle. In some cases, the cradle may have one or more wrist straps that wrap around a user's wrist. In other cases, the cradle may attach to other items including bicycle helmets, artificial reality devices, vehicles, or other objects. In such cases, the straps may be designed to wrap around or otherwise adhere to the respective objects. The straps may include antennas that connect to the internal electronic components of the capsule via a direct, ohmic connection, or via a capacitive connection. This connection may avoid any travel through the cradle (which is usually metallic). The wrist straps may also include sensors, including electromyography (EMG) sensors. EMG sensors may provide musculoskeletal motion information to the internal electronic components within the capsule. In some cases, the capsule may be coupled to the wrist strap antennas via the cradle and an interconnector. Or, in other cases, the capsule may be coupled directly via external RF transparent structures extending from the cradle and/or the wristband. In some cases, as will be described further below, wristbands may be interchangeable, with different wristband configurations supporting different types of antennas and RF technologies.

As noted above, wearable devices may be configured to be worn on a user's body, such as on a user's wrist or arm. Such wearable devices may be configured to perform a variety of functions. A wristband system, for example, may be an electronic device worn on a user's wrist that performs functions such as delivering content to the user, executing social media applications, executing artificial-reality applications, messaging, web browsing, sensing ambient conditions, interfacing with head-mounted displays, monitoring the health status associated with the user, etc. In some examples, a wristband system may include a watch band that detachably couples to a watch body. The watch body may include a coupling mechanism for electrically and mechanically coupling the watch body (e.g., the enclosure or capsule) to the watch band (e.g., the cradle). At least in some cases, the wristband system may have a split architecture that allows the watch band and the watch body to operate both independently and in communication with one another. The mechanical architecture may include a coupling mechanism on the watch band and/or the watch body that allows a user to conveniently attach and detach the watch body from the watch band.

The wristband system of FIGS. 1A and 1B, for example, may be used in conjunction with an artificial-reality (AR) system. Sensors of the wristband system (e.g., image sensors, inertial measurement units (IMUS), etc.) may be used to enhance an AR application running on the AR system. Further, the watch band may include sensors that measure biometrics of the user. For example, the watch band may include neuromuscular sensors (e.g., neuromuscular sensors 2110 of FIG. 21A) disposed on an inside surface of the watch band contacting the user that detects the muscle intentions of the user. The AR system may include a head-mounted display that is configured to enhance a user interaction with an object within the AR environment based on the muscle intentions of the user. Signals sensed by the neuromuscular sensors may be processed and used to provide a user with an enhanced interaction with a physical object and/or a virtual object in an AR environment. For example, the AR system may operate in conjunction with the neuromuscular sensors to overlay one or more visual indicators on or near an object within the AR environment such that the user could perform "enhanced" or "augmented" interactions with the object.

FIGS. 1A and 1B illustrate an embodiment of a wristband system including a watch band and a watch body. In some cases, neuromuscular sensors may be integrated within the wristband system, as shown in FIGS. 2A, 2B, and 2C. FIG. 1A illustrates an example wristband system 100 that includes a watch body 104 coupled to a watch band 112. Watch body 104 and watch band 112 may have any size and/or shape that is configured to allow a user to wear wristband system 100 on a body part (e.g., a wrist). Wristband system 100 may include a retaining mechanism 113 (e.g., a buckle) for securing watch band 112 to the user's wrist. Wristband system 100 may also include a coupling mechanism 106, 110 for detachably coupling watch body 104 to watch band 112. Still further, the wristband system 100 may include a button or wheel 108 that allows users to interact with the wristband system 100 including applications that run on the system.

Wristband system 100 may perform various functions associated with the user. The functions may be executed independently in watch body 104, independently in watch band 112, and/or in communication between watch body 104 and watch band 112. Watch band 112 and its associated antennas may be configured to operate independently (e.g., execute functions independently) from watch body 104. Additionally or alternatively, watch body 104 and its associated antennas may be configured to operate independently (e.g., execute functions independently) from watch band 112. At least in some cases, watch band 112 and/or watch body 104 may each include the independent resources required to independently execute functions. For example, watch band 112 and/or watch body 104 may each include a power source (e.g., a battery), a memory, data storage, a processor (e.g., a CPU), communications (including multiple different types of antennas), a light source (e.g., at least one infrared LED for tracking watch body 104 and/or watch band 112 in space with an external sensor), and/or input/output devices.

FIG. 1B illustrates an example wristband system 100 that includes a watch body 104 decoupled from a watch band 112. Watch band 112 may be donned (e.g., worn) on a body part (e.g., a wrist) of a user and may operate independently from watch body 104. For example, watch band 112 may be configured to be worn by a user and an inner surface of watch band 112 may be in contact with the user's skin. When worn by a user, sensor 114 may be in contact with the user's skin. Sensor 114 may be a biosensor that senses a user's heart rate, bioimpedance, saturated oxygen level, temperature, sweat level, muscle intentions, steps taken, or a combination thereof. Watch band 112 may include multiple sensors 114 and 116 that may be distributed on an inside surface, in an interior volume, and/or on an outside surface of watch band 112. In some examples, watch body 104 may include an electrical connector 118 that mates with connector 120 of watch band 112 for wired communication and/or power transfer. In some examples, as will be described further below, watch body 104 and/or watch band 112 may include wireless communication devices including LTE antennas, GPS antennas, Bluetooth antennas, WiFi antennas, NFC antennas, or other types of antennas.

Wristband system 100 may include a coupling mechanism for detachably coupling watch body 104 to watch band 112. A user may detach watch body 104 from watch band 112 in order to reduce the encumbrance of wristband system 100 to the user. Detaching watch body 104 from watch band 112 may reduce a physical profile and/or a weight of wristband system 100. Wristband system 100 may include a watch body coupling mechanism(s) 106 and/or a watch band coupling mechanism(s) 110. A user may perform any type of motion to couple watch body 104 to watch band 112 and to decouple watch body 104 from watch band 112. For example, a user may twist, slide, turn, push, pull, or rotate watch body 104 relative to watch band 112, or a combination thereof, to attach watch body 104 to watch band 112 and to detach watch body 104 from watch band 112.

As illustrated in FIG. 1B, in some examples, watch body 104 may include front-facing image sensor 115A and rear-facing image sensor 115B. Front-facing image sensor 115A may be located in a front face of watch body 104 (e.g., substantially near, under, or on the display 102), and rear-facing image sensor 115B may be located in a rear face of watch body 104. In some examples, a level of functionality of at least one of watch band 112 or watch body 104 may be modified when watch body 104 is detached from watch band 112. The level of functionality that may be modified may include the functionality of front-facing image sensor 115A and/or rear-facing image sensor 115B. Alternatively, the level of functionality may be modified to change how the various antennas within the system. For instance, as will be described further below, the embodiments herein may include a cosmetic RF transparent feature that may form a functional link between wrist strap antennas and internal electronic components including tuners, amplifiers, controllers, and data processors.

FIG. 2A illustrates a perspective view of an example wristband system 200 that includes a watch body 204 decoupled from a watch band 212. Wristband system 200 may be structured and/or function similarly to wristband system 100 of FIGS. 1A and 1B. Watch body 204 and watch band 212 may have a substantially rectangular or circular shape and may be configured to allow a user to wear wristband system 200 on a body part (e.g., a wrist). Wristband system 200 may include a retaining mechanism 213 (e.g., a buckle, a hook and loop fastener, etc.) for securing watch band 212 to the user's wrist. Wristband system 200 may also include a coupling mechanism 206 for detachably coupling watch body 204 to watch band 212. The watch body 204 may include an enclosure 206 that houses various electronic components. In some cases, the watch body 204 may be referred to as a "capsule."

Wristband system 200 may perform various functions associated with the user as described above with reference to FIGS. 1A and 1B. The functions executed by wristband system 200 may include, without limitation, display of visual content to the user (e.g., visual content displayed on display screen 202), sensing user input (e.g., sensing a touch on button 208, sensing biometric data on sensor 214, sensing neuromuscular signals on neuromuscular sensors 215 or 216, sensing audio input via microphones 220, etc.), messaging (e.g., text, speech, video, etc.), image capture (e.g., with a front-facing image sensor 203 and/or a rear-facing image sensor), wireless communications (e.g., cellular, near field, WiFi, personal area network, etc.), location determination, financial transactions, providing haptic feedback, alarms, notifications, biometric authentication, health monitoring, sleep monitoring, etc. These functions may be executed independently in watch body 204, independently in watch band 212, and/or in communication between watch body 204 and watch band 212. Functions may be executed on wristband system 200 in conjunction with an artificial-reality system such as the artificial-reality systems described in FIGS. 15-21B. In some examples, wristband system 200 may include vibrotactile system 1900 of FIG. 19.

Watch band 212 may be configured to be worn by a user such that an inner surface of watch band 212 may be in contact with the user's skin. When worn by a user, sensor 214 may be in contact with the user's skin. Sensor 214 may be a biosensor that senses a user's heart rate, saturated oxygen level, temperature, sweat level, muscle intentions, or a combination thereof. Watch band 212 may include multiple sensors 214 that may be distributed on an inside and/or an outside surface of watch band 212. Additionally or alternatively, watch body 204 may include the same or different sensors than watch band 212. For example, multiple sensors may be distributed on an inside and/or an outside surface of watch body 204 or on the surface of the wrist straps. The watch body 204 may include, without limitation, front-facing image sensor 115A, rear-facing image sensor 115B, a biometric sensor, an IMU, a heart rate sensor, a saturated oxygen sensor, a neuromuscular sensor(s) (e.g., neuromuscular sensors 2110 of FIG. 21A), an altimeter sensor, a temperature sensor, a bioimpedance sensor, a pedometer sensor, an optical sensor, a touch sensor, a sweat sensor, etc.

Watch band 212 may transmit the data acquired by sensor 214 to watch body 204 using a wired communication method (e.g., a UART, a USB transceiver, etc.) and/or a wireless communication method (e.g., near field communication, Bluetooth™, etc.). Watch band 212 may be configured to operate (e.g., to collect data using sensor 214) independent of whether watch body 204 is coupled to or decoupled from watch band 212. In some examples, watch band 212 may include a neuromuscular sensor 215 (e.g., an electromyography (EMG) sensor, a mechanomyogram (MMG) sensor, a sonomyography (SMG) sensor, etc.). Neuromuscular sensor 215 may sense a user's muscle intention. Neuromuscular sensor 215 may include neuromuscular sensor 2010 of FIG. 20A.

FIG. 2B is a side view and FIG. 2C is a perspective view of another example wristband system. The wristband systems of FIGS. 2B and 2C may include a watch body interface 230. Watch body 204 may be detachably coupled to watch body interface 230. In additional examples, one or more electronic components may be housed in watch body interface 230 and one or more other electronic components may be housed in portions of watch band 212 away from watch body interface 230.

Figure 3B:
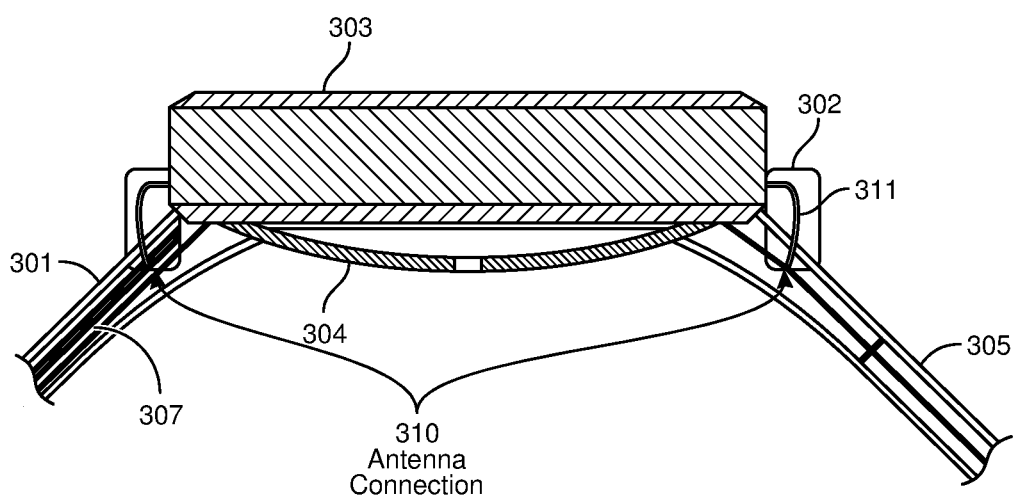
FIG. 3B illustrates an enlarged side view of an example wristband system, according to at least one embodiment of the present disclosure.

FIGS. 3A and 3B illustrate embodiments of a wristband system 300 that includes a capsule 303 and a cradle 304, along with two wrist straps 301 and 305. Although the wristband system 300 is shown as having two wrist straps (301 and 305), it will be recognized that the wristband system 300 may include a single strap, no strap, or more than two straps. Moreover, as noted above, the capsule 303 and cradle 304 may operate in many different environments, including placement on various types of mobile or stationary objects. Still further, as noted above, the capsule 303 may include internal electronic components that allow the capsule to function independently of the cradle 304 and, similarly, that the cradle 304 may include internal electronic components that allow the cradle to function independently of the capsule 303.

Either or both of the wrist straps 301/305 may include antennas. These antennas may be substantially any type of antennas, and may extend along the full length of the wrist strap, or may extend along only a portion thereof. Similarly, either or both of the wrist straps 301/305 may include sensors 306 including electromyography (EMG) electrodes or other types of sensors as noted above. As can be seen in the enlarged image of FIG. 3B, the wristband system 300 may include cosmetic RF transparent features 302 that may electrically link the antennas and/or sensors of the wrist bands 301/305 to the capsule 303 and/or to the cradle 304. These features 302 may be referred to as "cosmetic features" in that they may be coated with an RF transparent coating (e.g., plastic, paint, or other non-conducting material) in order to appear cosmetically or aesthetically pleasing. That said, these cosmetic RF transparent features are also functional. Indeed, these features electrically link the antennas and/or sensors of the wrist straps to the capsule 303. In FIG. 3B, this electrical connection may be a direct, ohmic connection. In other cases, the electrical connection may be a capacitive connection.

In FIG. 3B, the cosmetic features 302 may include a wire 311 or other portion of conductive material that provides a direct connection between the antennas 310 (and potentially other sensors 306 via a conductive trace 307) to the capsule 303. The wire 311 may travel through the RF transparent cosmetic feature 302. That conductive element 311 may electrically link the antennas 310 to the capsule while avoiding contact with or travel through the cradle 304. Because the cradle 304 may be metallic or made of some other type of metal for structural rigidity, the cradle may cause attenuation or distortion to signals that run through the cradle. As such, it may be advantageous to route signals and radiation from the wrist strap antennas through the cosmetic RF transparent feature 302 directly to the capsule, while avoiding contact with the cradle. These embodiments will be described further below with regard to FIGS. 4-7E.

Figure 4:
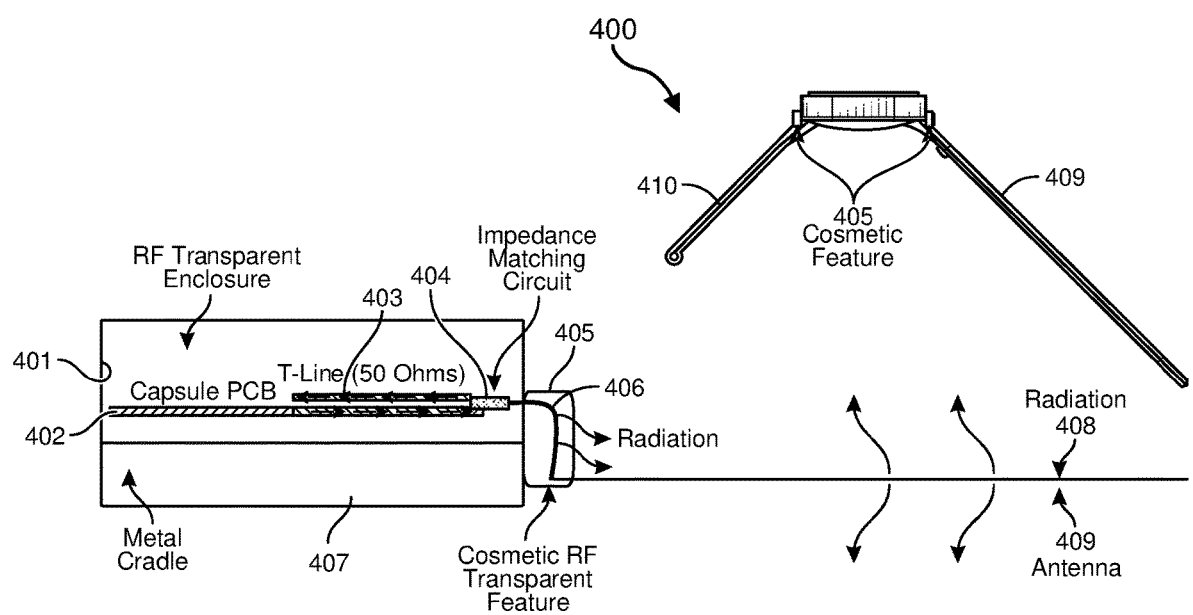
FIG. 4 illustrates a diagram of an embodiment of an example wristband system, according to at least one embodiment of the present disclosure.

FIG. 4 illustrates an embodiment of a wristband system 400 that may be similar to or the same as wristband system 300 of FIG. 3A. The wristband system 400 may include a capsule 401 that houses various electronic components. In some cases, these electronic components are coupled to a printed circuit board (PCB) 402. The PCB 402 may be mounted within the capsule, and may include a single layer board or a multi-layer board. The PCB 402 may include a power supply such as a battery, a controller, a processor, memory (e.g., random access memory (RAM)), data storage, various antennas (e.g., LTE, Bluetooth, WiFi, GPS, NFC, etc.), a tuner, an amplifier, a modem, one or more transmission lines, an impedance matching circuit, and/or other electronic components. The capsule 401 may function on its own, or may connect to another device or system, including the cradle 407. The cradle 407 may have its own internal circuitry and components provided on a PCB (not shown in FIG. 4). The cradle 407 may be made of metal to provide structural support and, at least in some cases, may act as a radiating element of an antenna.

In some cases, the straps 410 and 411 may connect to the cradle 407. The straps may connect to the cradle 407 mechanically in a manner that allows the straps to pivot relative to the cradle. Either or both of the straps 410/411 may include antennas 409 and/or sensors such as EMG sensors. The antennas and/or sensors may connect electrically to the capsule 401 via the cosmetic RF transparent feature 405. The cosmetic RF transparent feature 405 may include a conducting element 406 that electrically links the antennas and sensors of the straps 410/411 to the PCB of the capsule. While only one cosmetic RF transparent feature 405 in the diagram portion of FIG. 4, it will be recognized that the wristband system 400 may include two or more such features.

In some cases, the cosmetic RF transparent feature 405 may connect to an impedance matching circuit 404. That impedance matching circuit 404 may, in turn, connect to antenna transmission lines 403 that electrically connect to the internal circuitry of the PCB (e.g., to a power amplifier, low noise amplifier, RF filter, diplexer, etc.). During operation, the impedance matching circuit 404 may be designed to match the impedance value of one side of the transmission lines 403 to the resistance of the other side of the transmission lines. Achieving such a match may result in an optimal amount of power being transferred from one side of the transmission lines to the other. The impedance matching circuit 404, when positioned between the antenna 409 and the transmission lines 403, may thus help avoid a mismatch in impedance and resistance values, which could result in lower power transfer efficiencies.

In some embodiments, when the straps 410/411 are connected to the capsule 401 via one or more cosmetic RF transparent features 405, the wrist straps may each separately act as radiating portions 408 of an antenna such as a dipole antenna. In such cases, the capsule 401 and/or cradle 407 may act as the second arm of the dipole antenna. In some examples, a single strap 410 in conjunction with the capsule 401 may form one side of a dipole, and the other strap 411 may form the other side of the dipole. Accordingly, in various embodiments, different portions of the wristband system 400 may function as different arms of an antenna. In some cases, the usage of different parts of the wristband system 400 as different parts of an antenna may vary depending on which antenna technology is being used. Additionally or alternatively, this usage of different parts of the wristband system 400 may be based on which frequency band is being used, whether one strap has an antenna or whether both straps have antennas, whether only a single strap is being used, which internal antennas exist within the capsule, or other factors. The embodiments herein may allow for flexibility in how different components are implemented. Indeed, as will be explained further below, the wristband system may allow for interchangeable straps, some of which may have different antennas and/or sensors. The internal circuitry of the capsule or the cradle may account for these differences and may be configured to optimize power and transmission efficiency, regardless of which straps (or antennas) are in use.

The radio frequency (RF) transparent interconnect that electrically connects the antenna 409 in strap 411 to the electronic components in the capsule 401 may be designed to avoid contact with or travel through the cradle 407. As noted above, at least in some embodiments, the cradle 407 may be metallic or may be manufactured using some other conductive material. In such cases, this conductive material may act to ground, attenuate, or distort the radiation 408 transmitted (or received) through the antenna 409. Accordingly, in at least some cases, the embodiments herein may avoid electrical contact with the cradle, and may avoid placing any conductive material within the cradle 407. In some cases, this may be accomplished using a cosmetic RF transparent feature 405. The cosmetic RF transparent feature 405 may also avoid electrical connections between the capsule and the cradle. Indeed, as will be described further below, if the antenna and associated transmission lines of an antenna feed were to be routed through the metallic cradle 407, the transmission lines would need to be connected to the PCB 402 of the capsule 401 via an interconnector (e.g., a 50-Ohm interconnector), as well as additional control lines. Such interconnectors may, at least in some cases, be difficult to manufacture and may be subject to breakdown over time as the capsule and cradle are repeatedly coupled and uncoupled.

The term "RF transparent," as used herein, may refer to any material that allows transmission of or reception of radio frequency (RF) electromagnetic waves. Thus, in contrast to a metallic cradle 407, which is RF opaque, the cosmetic RF transparent feature 405 may be capable of receiving and/or transmitting RF waves. The conductive element 406 (e.g., a wire or capacitor) may receive radiation 408 from (or transmit radiation through) antenna 409. In some embodiments, the cosmetic RF transparent feature (also referred to herein as an "RF transparent interconnect") may include a direct ohmic connection between the antenna 409 in the strap 411 and various transmission lines 403 in the capsule 401. An impedance matching circuit 404 may be placed between the RF transparent interconnect and the transmission lines. As noted above, this impedance matching circuit may be configured to match transmission line and antenna impedance values to maximize power efficiency when transmitting or receiving wireless signals.

Figure 5A:
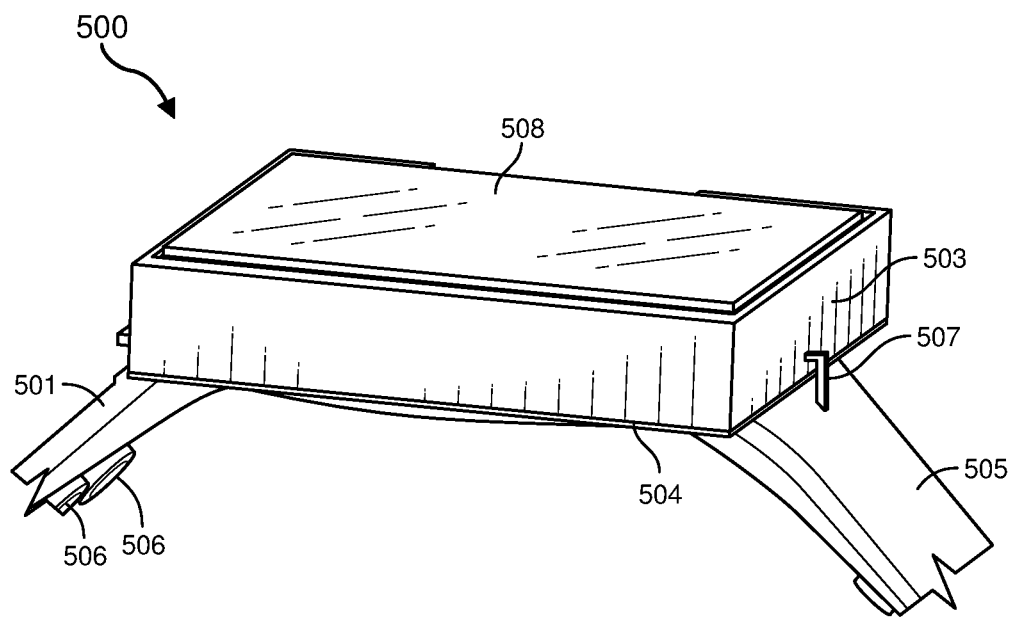
FIGS. 5A-5E illustrate various views of an embodiment of an example wristband system.

The direct, ohmic interconnect 406 may be seen in the various views of wristband system 500 of FIGS. 5A-5E. As shown in FIG. 5A, for example, wristband system 500 may include a capsule 503, a cradle 504, a display 508, one or more straps 501 and 505, various sensors including EMG sensors 506, and a direct, ohmic connection 507 that connects the antennas of the straps to the internal circuitry of the capsule 503. The capsule 503 may be manufactured in substantially any size or shape, using substantially any type of RF transparent material. In these embodiments, the cradle 504 may be manufactured using substantially any type of material, including metallic or conductive materials. The direct, ohmic connection 507 may be designed to avoid contact with or travel through the cradle 504. In some cases, an aligning mechanism may be implemented on the capsule 503, on the cradle 504, and/or on the straps 501/505 to align the straps with the capsule. The aligning mechanism may be a mechanical clip or pin, or may include magnets on the capsule and on the wrist strap, or may be any other mechanical means of securing the strap to the cradle and/or capsule. This secure connection may allow the direct, ohmic connection 507 to seat properly, and transfer the maximal amount of energy between the antennas in the wrist straps and the capsule.

Figure 5B:
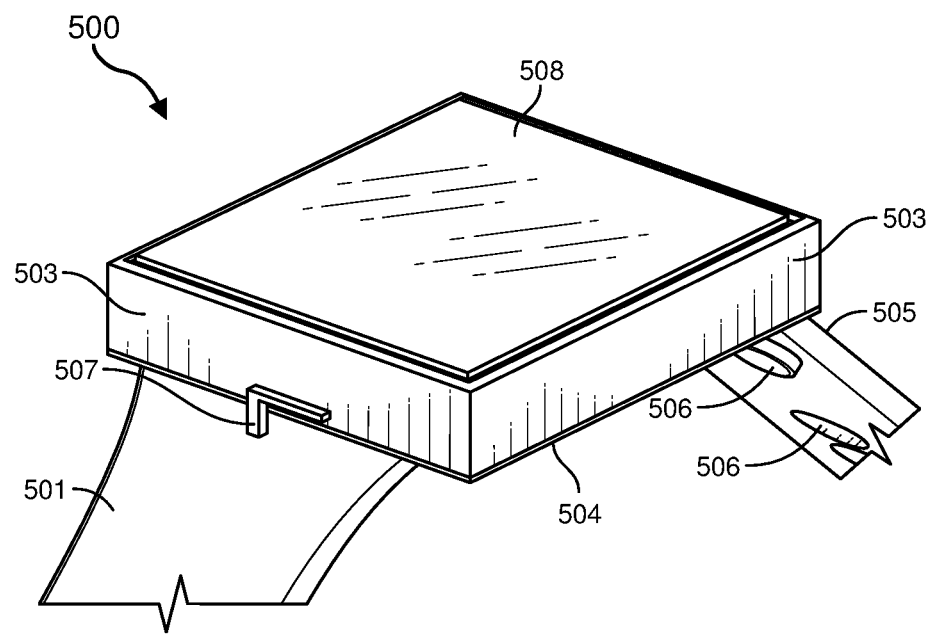
Figure 5C:
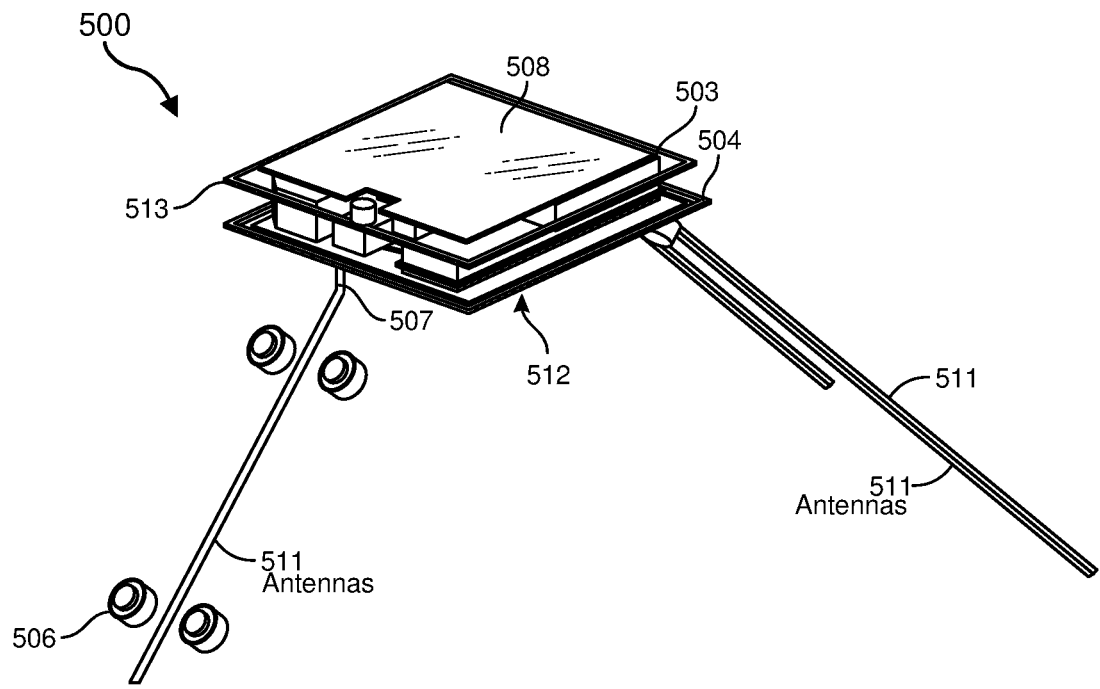
Figure 5D:
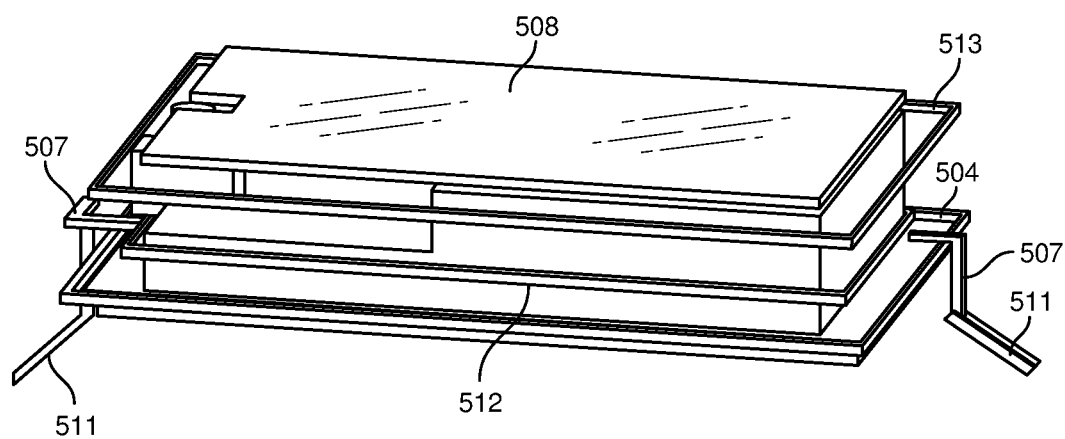
Figure 5E:
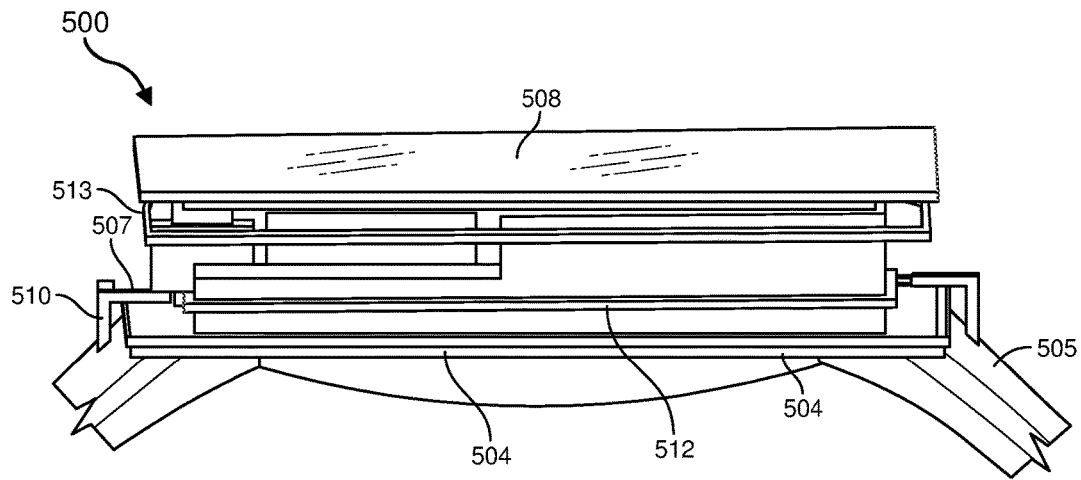

FIG. 5B illustrates a rotated perspective view of the wristband system 500. The rotated perspective view of the wristband system 500 may more clearly show the direct, ohmic connection 507 between the wrist strap 501 and the capsule 503. FIG. 5C illustrates a component view of the wristband system 500 with the straps 501/505 removed, but where the embedded components of the straps remain in view. For instance, in FIG. 5C, the antennas 511 of the various wrist straps are visible, as are the EMG electrodes 506. These antennas 511 and EMG electrodes 506 may directly connect to the PCB 512 of capsule 503 via the direct, ohmic connection 507. As shown in FIG. 5D, the direct, ohmic connection 507 electrically connecting the antennas 511 to the PCB 512 may avoid the cradle 504. The direct, ohmic connection 507 may also avoid other capsule components such as the loop antenna 513. FIG. 5E further illustrates a side view that shows how the direct, ohmic connection 507 may avoid contact with the cradle 504, and may provide a direct connection between the antennas 511 of the wrist straps 501/505 and the internal components of the PCB 512.

Figure 6:
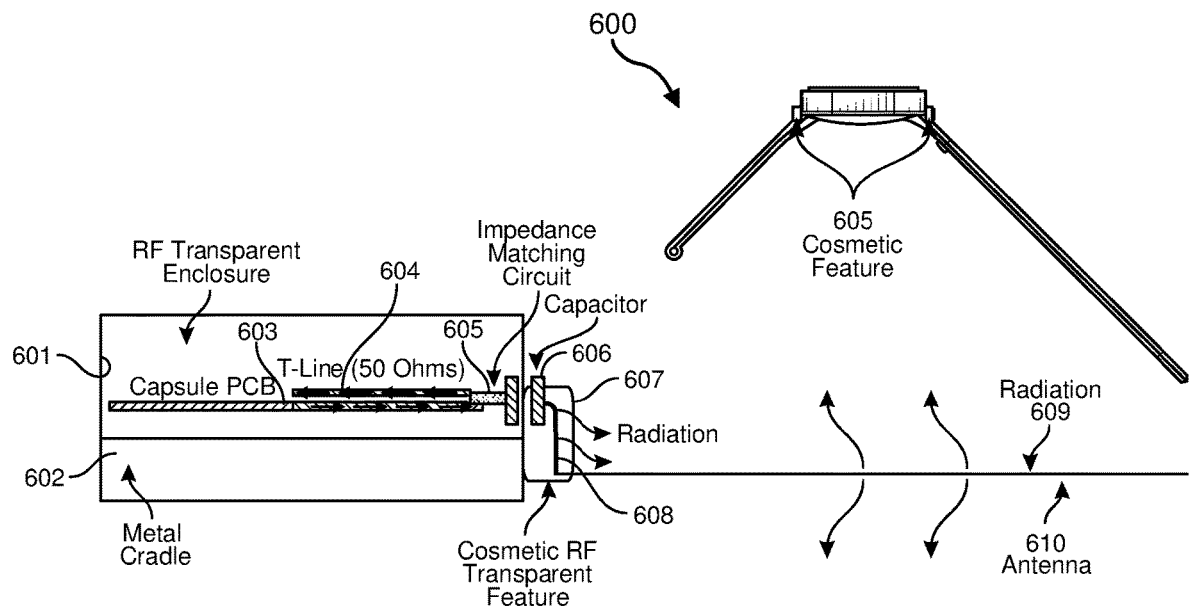
FIG. 6 illustrates a diagram of an alternative embodiment of an example wristband system, according to at least one embodiment of the present disclosure.
Figure 7A:
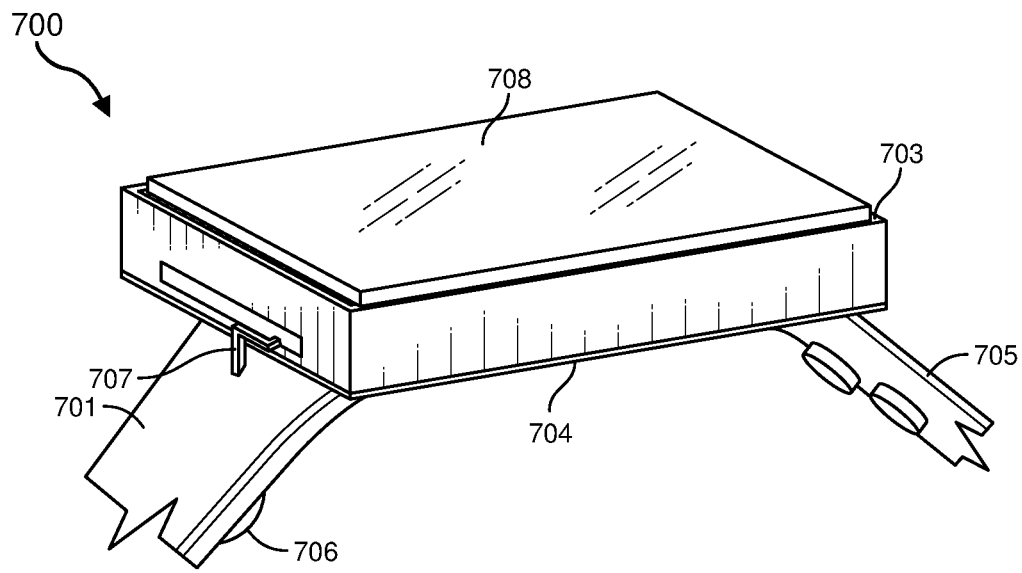
FIGS. 7A-7E illustrate various views of an alternative embodiment of an example wristband system.
Figure 7B:
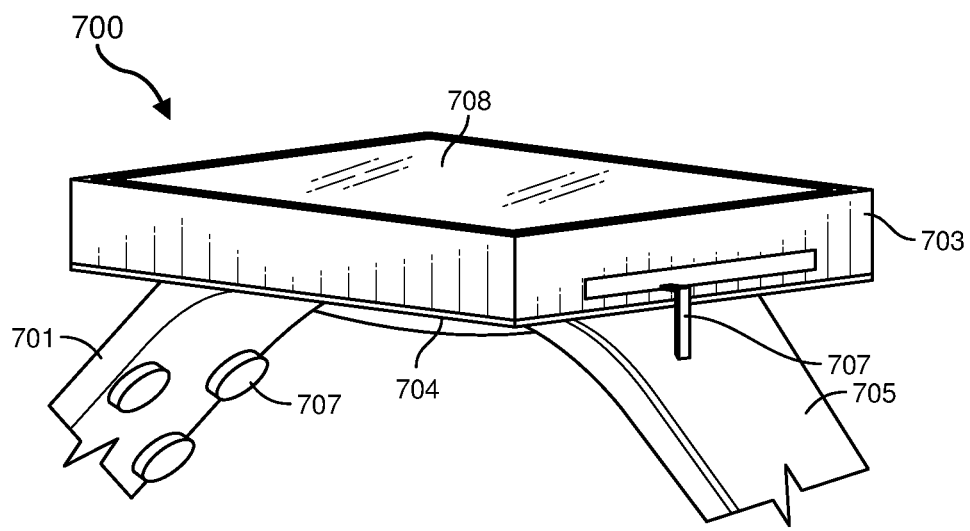
Figure 7C:
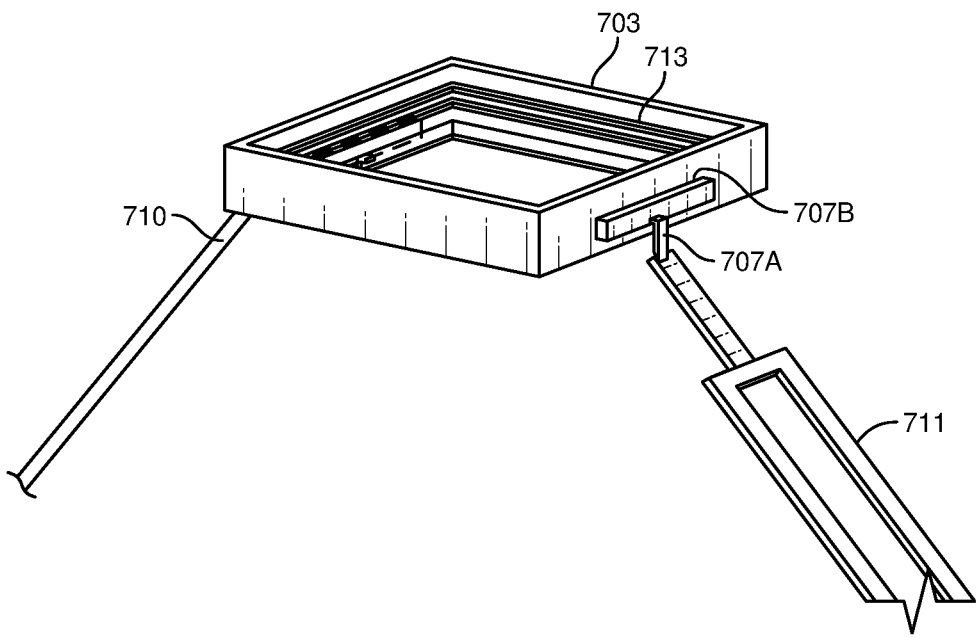
Figure 7D:
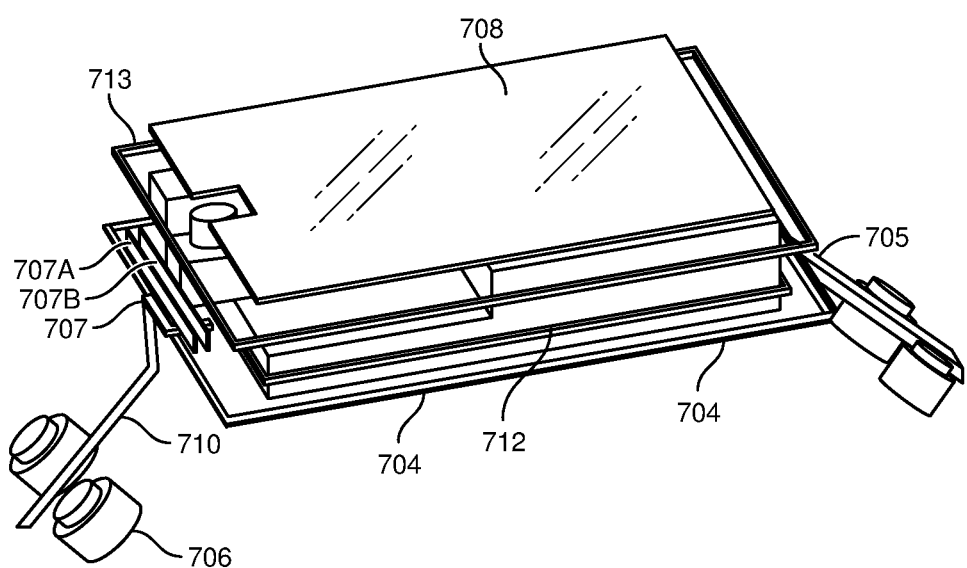
Figure 7E:
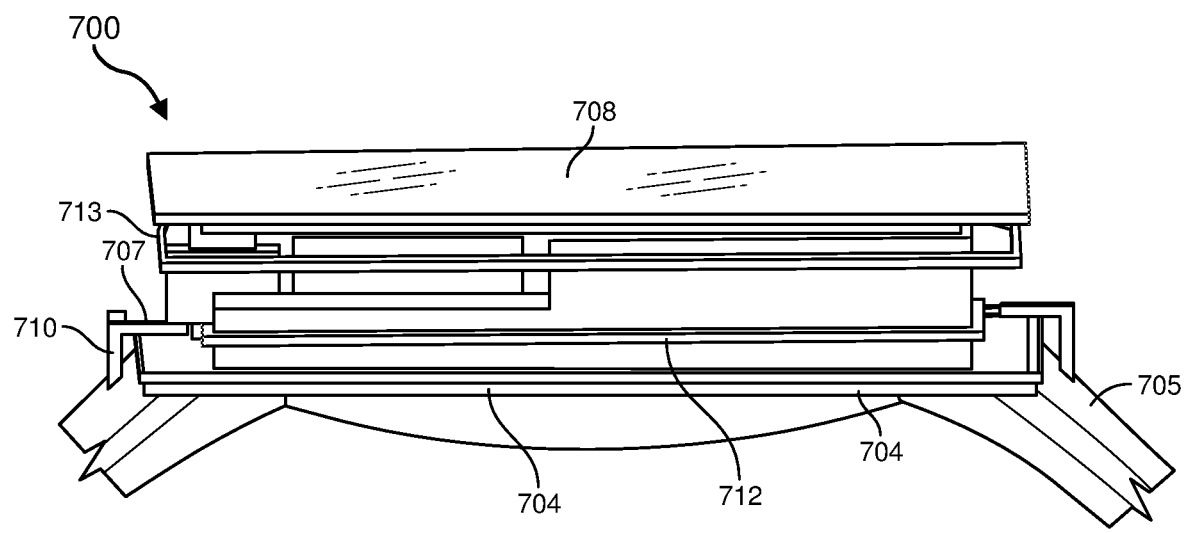

FIGS. 6-7E illustrate an alternative embodiment of a wristband system 600/700. The wristband system 600 of FIG. 6, for example, may include an RF transparent enclosure (e.g., a capsule 601) similar to or the same as the capsule 401 of FIG. 4. The wristband system 600 may also include a (metallic) cradle 602, along with an antenna 610 in a wrist strap that connects, via a cosmetic RF transparent feature 607, to an impedance matching circuit 605. The impedance matching circuit 605 may be configured to match the impedance of the transmission lines 604 with that of the antenna 610. The transmission lines 604 may, in turn, electrically connect to internal electronic components (e.g., power amplifier, low noise amplifier, RF filter, diplexer, etc.) mounted on a PCB 603. In this embodiment, the cosmetic RF transparent feature 607 may be different than the direct, ohmic connection of FIG. 4. The cosmetic RF transparent feature 607 of FIG. 6 may be capacitive in nature, such that the radiation 609 of the antenna is passed through a capacitive connection 607 between the antenna and the impedance matching circuit 605. Like the cosmetic RF transparent feature 405 of FIG. 4, the cosmetic RF transparent feature 607 may include a wire or other conductive material 608 linking the antenna 610 to the impedance matching circuit 605. However, in this embodiment, that conductive material 608 does not directly contact the impedance matching circuit 605 or transmission lines 604. Rather, the conductive material 608 may reside within and travel through an RF transparent coating to a first end of a capacitor 606. A second end of the capacitor may reside within capsule 601. The two ends of the capacitor 606 may allow the transfer of radiation 609 through the antenna 610.

The capacitive connection 607 may allow the capsule 601 to be coupled to the cradle 602 without a direct, physical (e.g., ohmic) connection between the antenna(s) of the wrist straps and the internal circuitry of the capsule. Because of this lack of a direct physical connection, a capacitive connection 607 may withstand a higher number of couplings and uncouplings before failure. Such a capacitive connection 607 may also tolerate some amount of misalignment and still function within operational boundaries. The capacitive connection 607 may also allow transfer of sensor signals from EMG or other sensors that may be embedded in the wrist straps.

For example, as shown in FIG. 7A, a wristband system 700 may include wrist straps 701 and/or 705. These wrist straps 701/705 may include embedded sensors 706 and/or antennas. These sensors and antennas may connect to controllers, processors, and/or other internal circuitry within the capsule 703 via a capacitive connection 707. Additionally or alternatively, in cases where the cradle 704 includes a PCB with associated electronic components, the sensors 706 and/or antenna (e.g., 610) embedded in the wrist straps 701/705 may capacitively connect to those components as well. The rotated view of FIG. 7B illustrates how both sides of the capsule 703 may include capacitive connections to the antennas and/or sensors of the wrist straps. Here, it should be noted that, while the embodiments of FIGS. 5A and 7A illustrate the respective wristband systems 500/700 as having either direct, ohmic connections, or capacitive connections, a given wristband system may include a combination of connections, such that one wrist strap connects capacitively on one side, while another wrist strap connects via a direct, ohmic connection on the other side.

Furthermore, as with the direct, ohmic connection, the capacitive connection 707 may also avoid contact with or travel through the cradle 601. Indeed, as shown in FIGS. 7C, 7D, and 7E, the antennas 710 and 711 may connect via capacitive connections 707 to the internal components of the PCB 712. These figures illustrate how the conductive material between the antennas and the internal components ends in a capacitor with two opposing plates 707A and 707B. These plates 707A/707B may capacitively couple to allow the transmission of radiation and/or sensor signals between the antennas and sensors of the wrist straps to the internal components of the capsule 703. FIG. 7C illustrates an embodiment without the cradle 704, while FIGS. 7D and 7E show the capsule as coupled to a cradle.

The embodiments described herein may be implemented with or without a cradle. In some cases, the capsule 703 may have its own internal antennas (e.g., 713). In such cases, the internal antennas 713 may operate in isolation from the antennas 710/711, or may operate in conjunction with antennas 710/711, using one end of a wrist strap, for example, as one part of a dipole antenna, while using the internal antenna 713 as the other part of the dipole antenna. A display 708 and other components may be housed within capsule 703, in addition to the internal antenna 713 and other electronic components disposed on the PCB 712.

Figure 8:
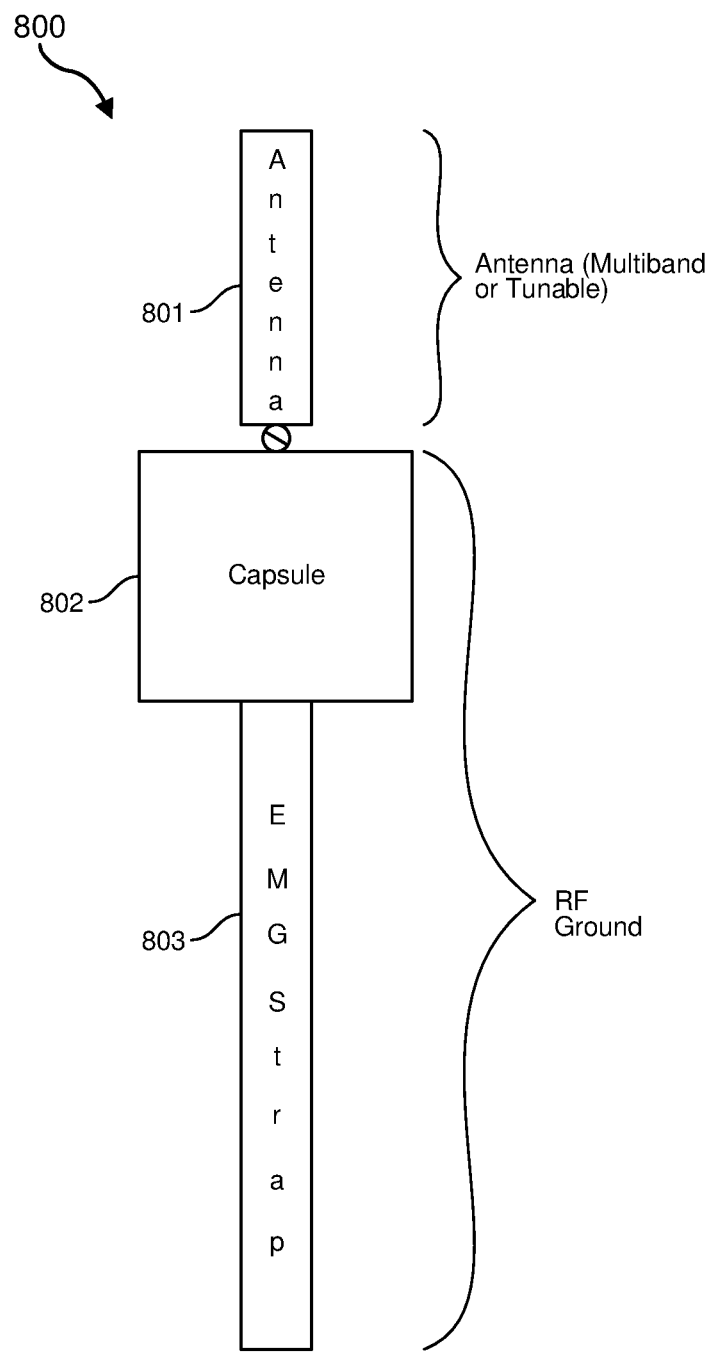
FIG. 8 illustrates an embodiment of an example wristband system that includes antennas and sensors within associated straps.
Figure 9A:
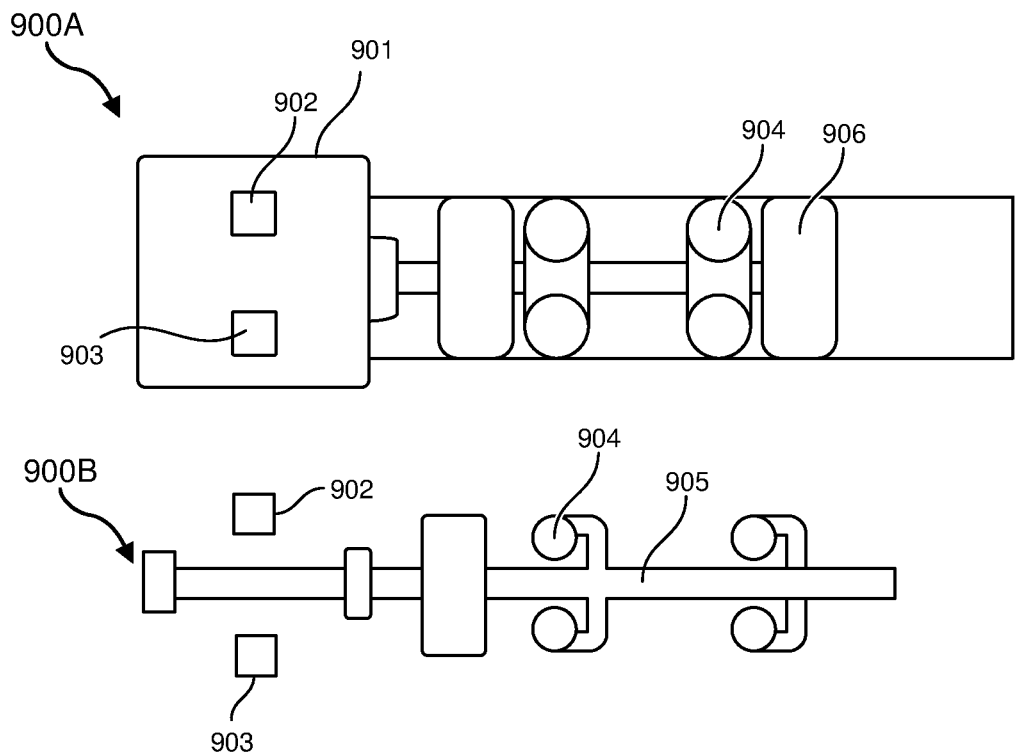
FIGS. 9A & 9B illustrate embodiments in which sensors and antennas share trace material, according to at least one embodiment of the present disclosure.
Figure 9B:
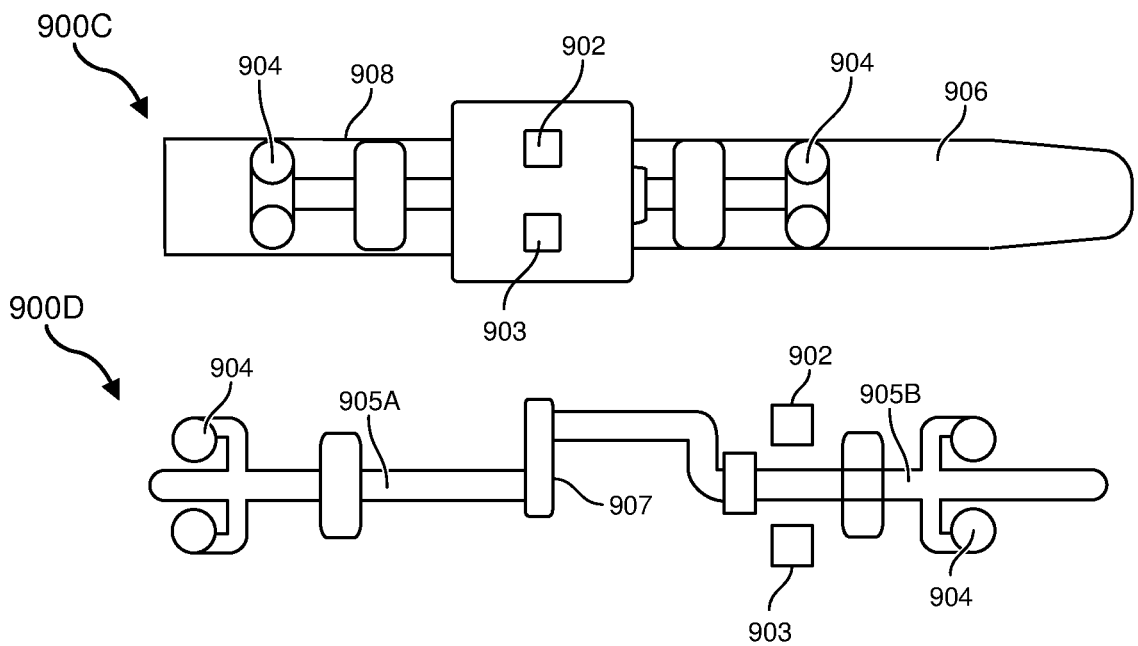

FIGS. 8, 9A, and 9B illustrate embodiments in which various wristband systems include different combinations of antennas and sensors in the wrist straps. FIG. 8, for example, illustrates an embodiment in which a capsule 802 is attached to two wrist straps 801 and 803. In this embodiment, the shorter wrist strap 801 includes a multiband or tunable antenna. As noted above, the capsule 802 may include a tuner and/or other electronic components of an antenna feed. The multiband or tunable antenna may be designed to receive and/or transmit different radio frequency wavelengths. These different wavelengths may be used to communicate over different communication bands including, for example, LTE (or other cellular band), GPS, WiFi, Bluetooth, NFC, etc. In the embodiment of FIG. 8, the longer wrist strap 803 may include one or more EMG sensors that provide musculoskeletal movement information to the capsule 802. In this embodiment, the capsule 802 and the longer wrist strap 803 may act together as an RF ground for the multiband or tunable antenna.

The antennas and EMG electrodes may be positioned on different straps, or on the same straps. In FIGS. 9A and 9B, for example, a wristband system 900A may include a capsule 901 and a wrist strap 906. The capsule 901 may have various sensors 902 and 903 (which may be different sensors or part of the same sensor) including heart rate sensors, pulse oximetry sensors, or other types of sensors. The wrist strap 906 may also include EMG sensors 904 or other types of sensors. As shown in wristband system 900B of FIG. 9B, the EMG sensors 904 and an antenna 905 may share the same conductive material. That conductive material may then be electrically connected to the capsule 901 via a direct, ohmic connection, via a capacitive connection, or via some other type of connection. Other electronic components may also be embedded in the wrist strap.

FIG. 9B illustrates a similar embodiment, except that the capsule of wristband system 900C/900D includes two wrist straps (906 and 908). In this embodiment, the straps 906 and 908 each include EMG sensors 904, as well as antennas 905A and 905B, respectively. Each wrist strap may include substantially any number of EMG sensors or other types of sensors. Each sensor may be electrically connected to the same conductive material that carries radiation from the antennas 905A/905B. Either or both wrist straps may include a cosmetic RF transparent feature 907 that electrically links the antennas and sensors to the internal electronic components of the capsule 901. Impedance matching circuits within the capsule 901 may then be implemented to match the impedance of the conductive material (carrying both the radiation and the sensor signals) to that of the internal circuitry. The sensor signals and antenna signals may then be processed and/or stored within the capsule 901.

Figure 10:
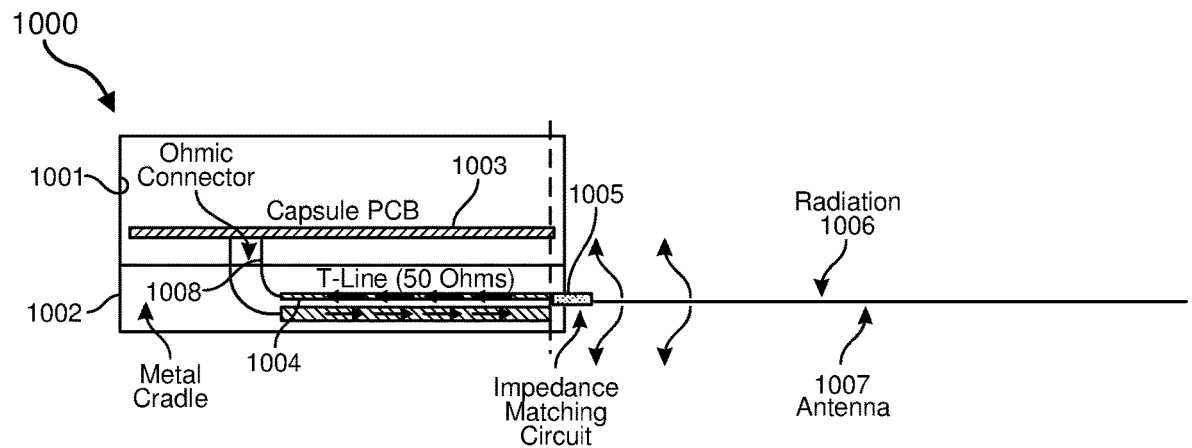
FIG. 10 illustrates a diagram of an alternative embodiment of an example wristband system, according to at least one embodiment of the present disclosure.

FIG. 10 illustrates an alternative embodiment of a wristband system 1000. The wristband system 1000 may include transmission lines 1004 that are embedded within or at least run through the metallic cradle 1002. As with the embodiments above, the wristband system 1000 may include a capsule 1001 having a PCB 1003 and internal circuitry. The capsule 1001 may be configured to couple to the metallic cradle 1002. In this embodiment, however, the antenna 1007 may not be linked to the capsule 1001 via a cosmetic RF transparent feature. Instead, the antenna 1007 and its associated radiation 1006 may flow to the transmission lines through an impedance matching circuit 1005. The impedance matching circuit 1005 may, in turn, be electrically connected to the transmission lines 1004 that run through the metallic cradle 1002. In order for the transmission lines 1004 to operate properly within the metallic (conductive) cradle, the transmission lines 1004 may be connected to the PCB 1003 via a direct, ohmic connection 1008. In some cases, the ohmic connector may be a 50-Ohm pin connector.

Figure 11A:
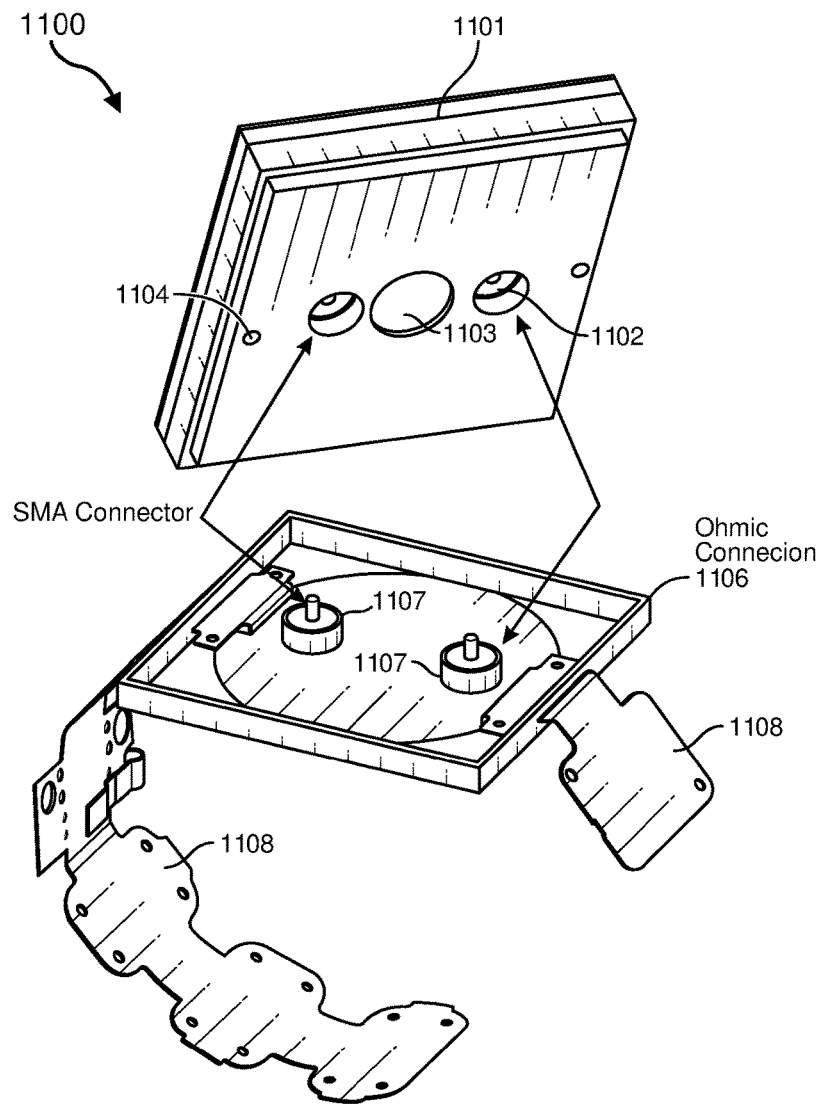
FIGS. 11A-11C illustrate various views of an alternative embodiment of an example wristband system, according to at least one embodiment of the present disclosure.
Figure 11B:
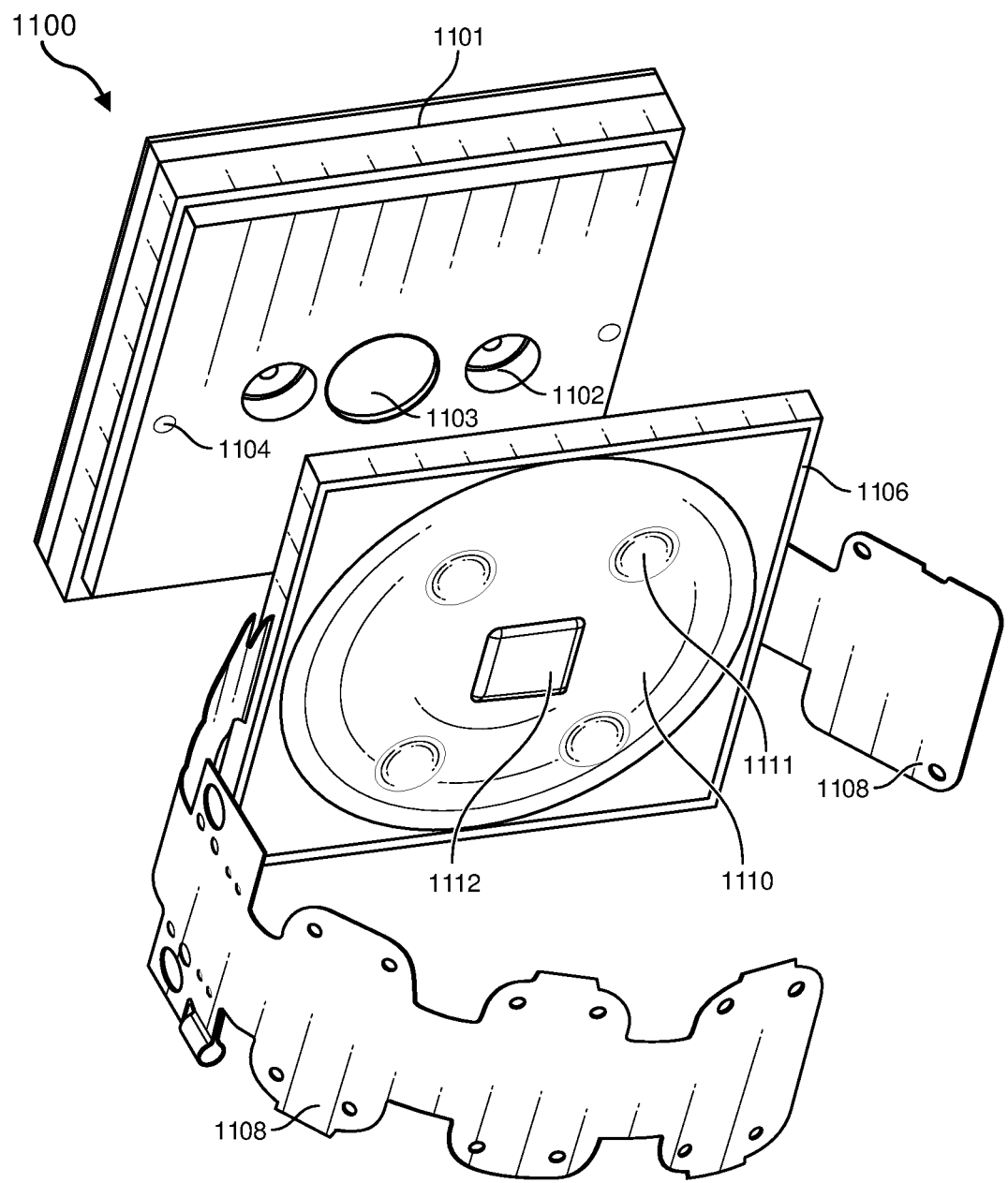
Figure 11C:
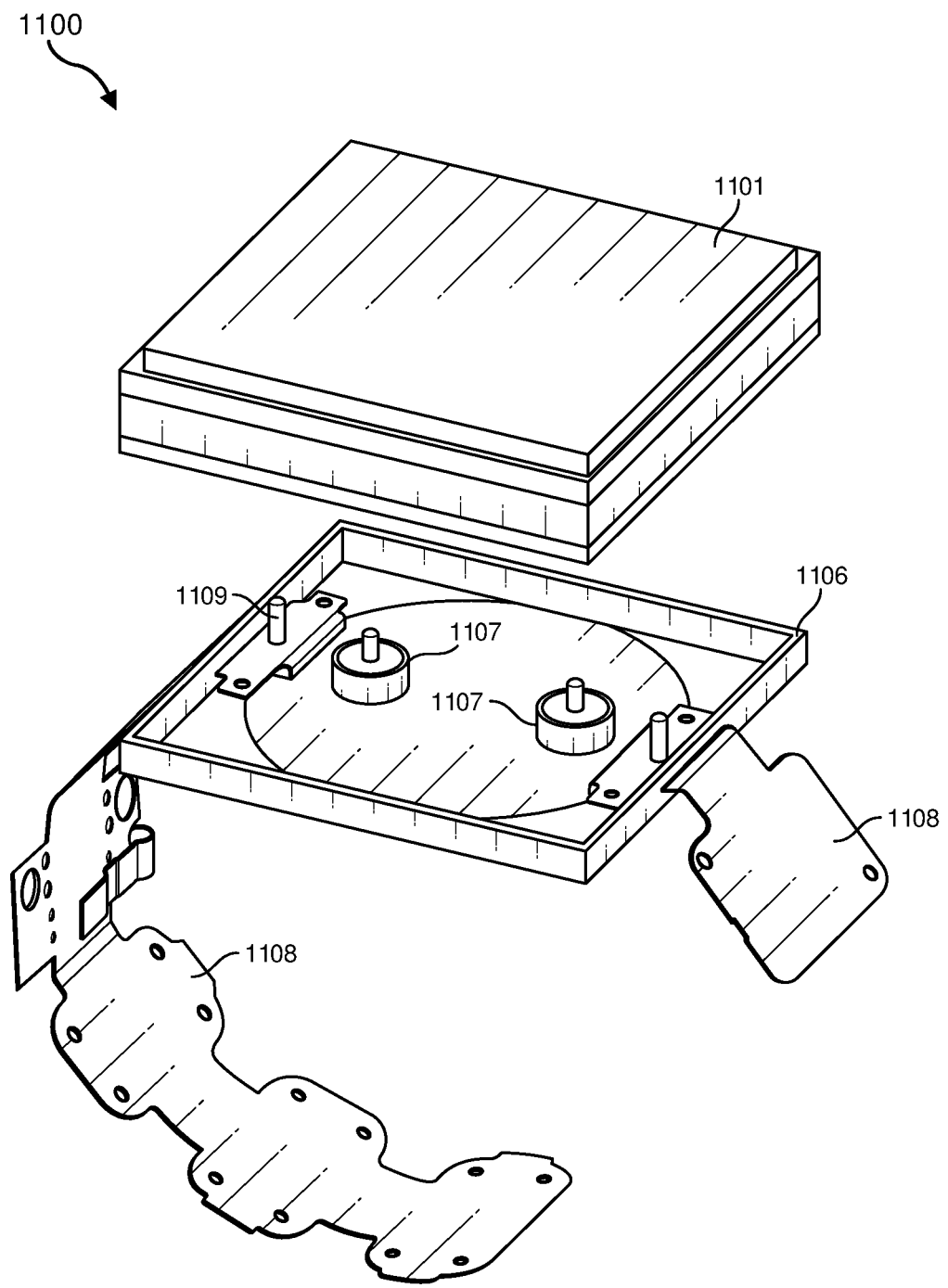

An example of such a pin connector embodiment is illustrated in FIGS. 11A-11C. The wristband system 1100, which may be the same as or different than wristband system 1000 of FIG. 10, may include a capsule 1101 and a cradle 1106. The cradle may include a direct, ohmic connector 1107 that connects to a receiving end 1102 in the capsule. In some cases, the direct, ohmic connector may be a SubMiniature version A (SMA) connector that is rated at or near 50 Ohms. The wristband system 1100 may include multiple antennas 1108A and 1108B that connect to the capsule through the cradle (as generally shown in FIG. 10) via the direct, ohmic connector 1107 and corresponding receiving end 1102. In some cases, the capsule may include a cavity 1103 for other electronic components including sensors or cameras. FIG. 11B illustrates a bottom perspective view of the wristband system 1100, and shows how various sensors 1110, 1111, and/or 1112 (including heart rate or other health sensors) may be provided on the underside of the cradle 1106. As with the embodiments described above, the cradle 1106 may have its own PCB and circuitry, including processors, controllers, memory, data storage, sensors, tuners, amplifiers, or other electronic components.

Figure 12A:
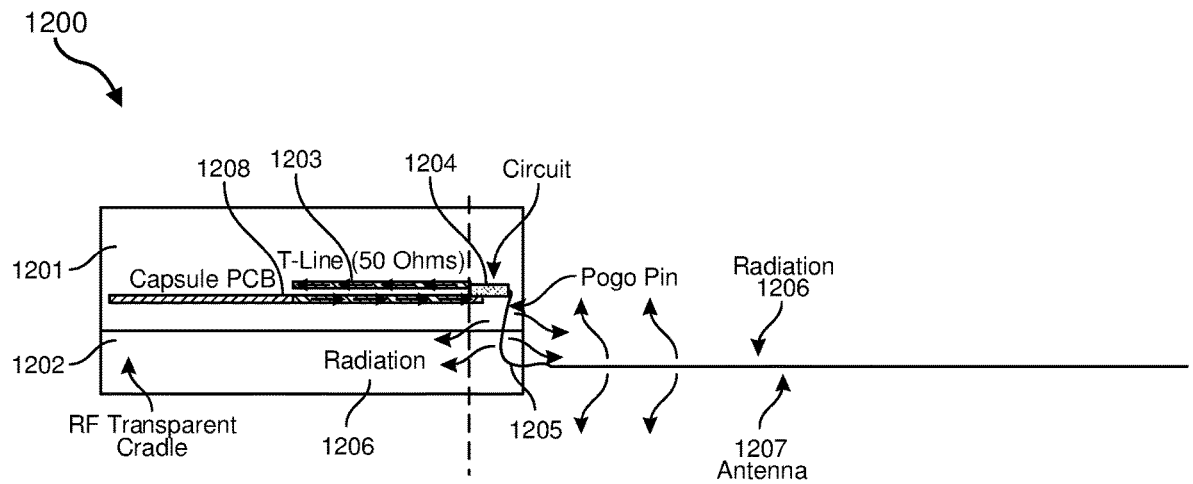
FIGS. 12A and 12B illustrate a diagram of an alternative embodiment of an example wristband system, according to at least one embodiment of the present disclosure.
Figure 12B:
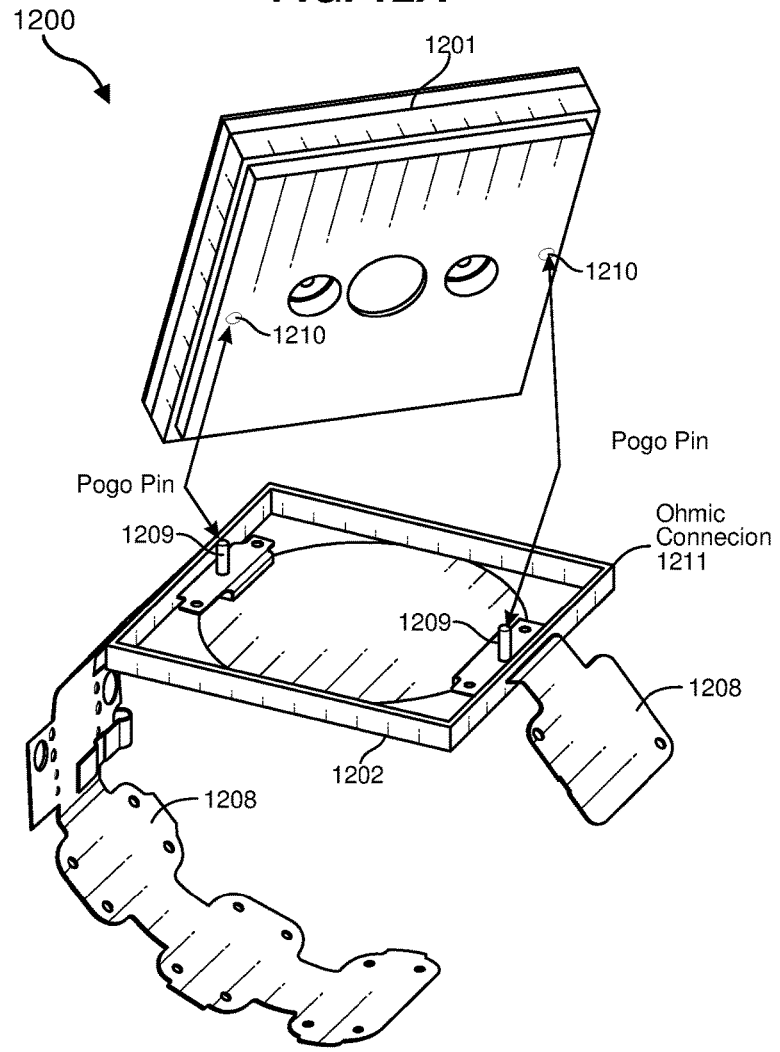

FIGS. 12A and 12B illustrate embodiments of a wristband system 1200 where the cradle 1202 is formed using a non-metallic, non-conductive RF transparent material. For example, as shown in FIG. 12A, the cradle 1202, which may couple to capsule 1201, may be produced using a non-conductive, RF transparent material. In such cases, because the cradle is RF transparent, the radiation 1206 from the antenna 1207 may run directly through the cradle via a conductive element 1205. In the examples above, where the cradle was metallic (or otherwise conductive), running the antenna connections through the cradle may ground or at least attenuate the signal coming from the antenna. In this case, however, because the cradle 1202 is RF transparent, the radiation 1206 may flow through the cradle substantially without attenuation or signal loss. As such, the antenna 1207 may connect via a conductive element 1205 through the cradle 1202 to an impedance matching circuit 1204. That impedance matching circuit may then couple to the transmission lines 1203 and on to electronic components of a capsule PCB 1208. In some cases, as shown in FIG. 12B, the conductive element 1205 that connects the impedance matching circuit 1204 to the antenna 1207 may be a pogo pin 1209 or other type of spring contact. The pogo pins 1209 may link the various antennas 1208 to the capsule 1201 via contacts 1210. These pogo pins 1209 and contacts 1210 may form an ohmic connection 1211 between the cradle 1202 and the capsule 1201.

Figure 13:
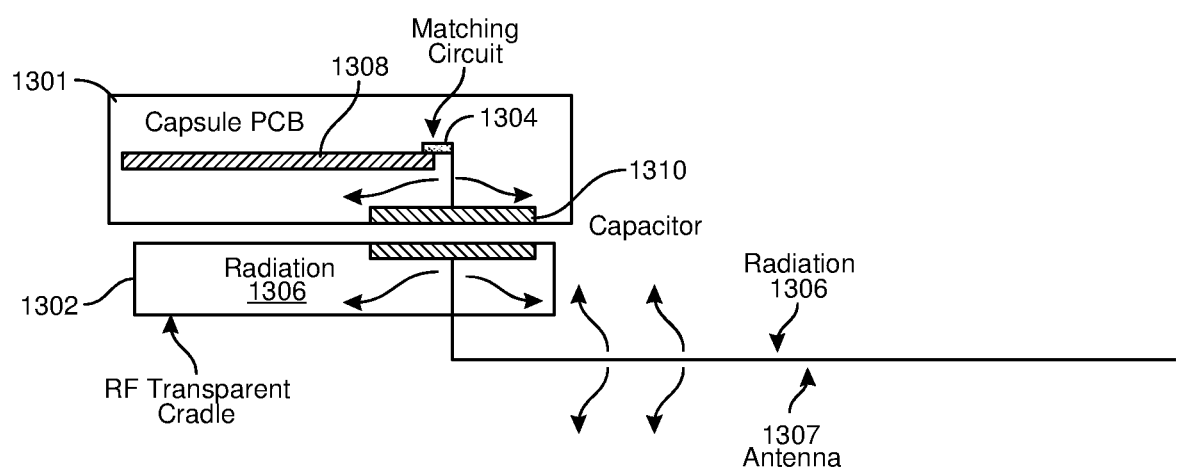
FIG. 13 illustrates a diagram of an alternative embodiment of an example wristband system, according to at least one embodiment of the present disclosure.

FIG. 13 illustrates a similar example embodiment where the cradle 1302 is formed using an RF transparent material.

However, in this embodiment, the cradle 1302 may be coupled to the capsule 1301 via a capacitor 1310 instead of a direct connection (e.g., 1205 of FIG. 12A). Radiation 1306 from the antenna 1307 may flow through the RF transparent cradle 1302 to the capacitor 1310. The radiation 1306 (and/or sensor signals from any sensors that may be embedded in the wrist strap(s) of the wristband system) may then flow through the capacitor 1310 to an impedance matching circuit 1304 and on to the capsule PCB 1308. Thus, in embodiments where an RF transparent cradle 1302 is implemented, the antenna 1307 may connect to the PCB 1308 via a direct, ohmic connection through the cradle, or via a capacitive connection that likewise runs through the cradle. As with the embodiments above, an aligning mechanism (e.g., a clip or a magnet) may be implemented to align the antenna 1307 with the direct connection 1305 or with the capacitive connection 1310. Moreover, as with the examples above, the wristband system 1300 may implement interchangeable wrist straps, some of which may have different antennas and/or sensors. The internal circuitry of the capsule 1301 and/or the cradle 1302 may account for these differences in antennas or sensors, and may be configured to optimize power and transmission efficiency, regardless of which straps (or antennas) are in use.

Figure 14A:
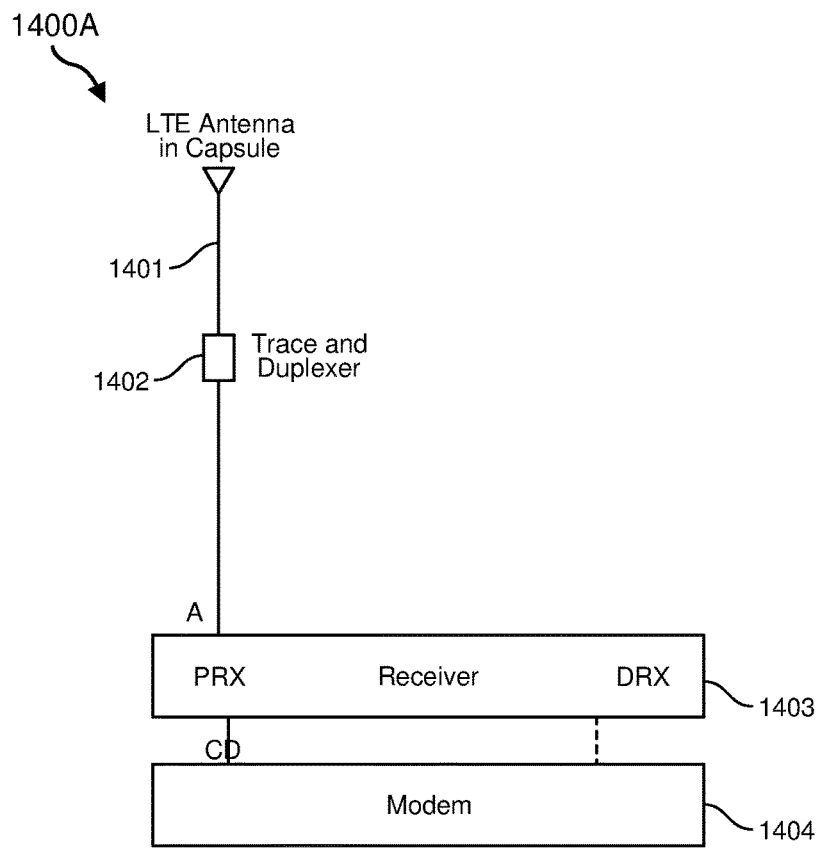
FIGS. 14A-14D illustrate diagrams of alternative embodiments of an example wristband system, according to at least one embodiment of the present disclosure.

FIGS. 14A-14D illustrate various antenna architecture embodiments that may be used with any of the embodiments described herein. FIG. 14A, for example, illustrates an antenna architecture 1400A that includes an LTE antenna 1401 in a capsule (e.g., capsule 303 of FIG. 3), along with a duplexer or FEM 1402. While shown as being an LTE antenna, it will be recognized that the antenna 1401 may be substantially any type of antenna, including a WiFi, Bluetooth, GPS, NFC, or other type of antenna. The antenna 1401 and duplexer or FEM 1402 may connect to a transceiver 1403 that is configured to transmit or receive signals from the LTE antenna. The transceiver may then pass the antenna signals to a modem 1404 that process those signals and passes the processed signals to the capsule for implementation in various software applications.

Figure 14B:
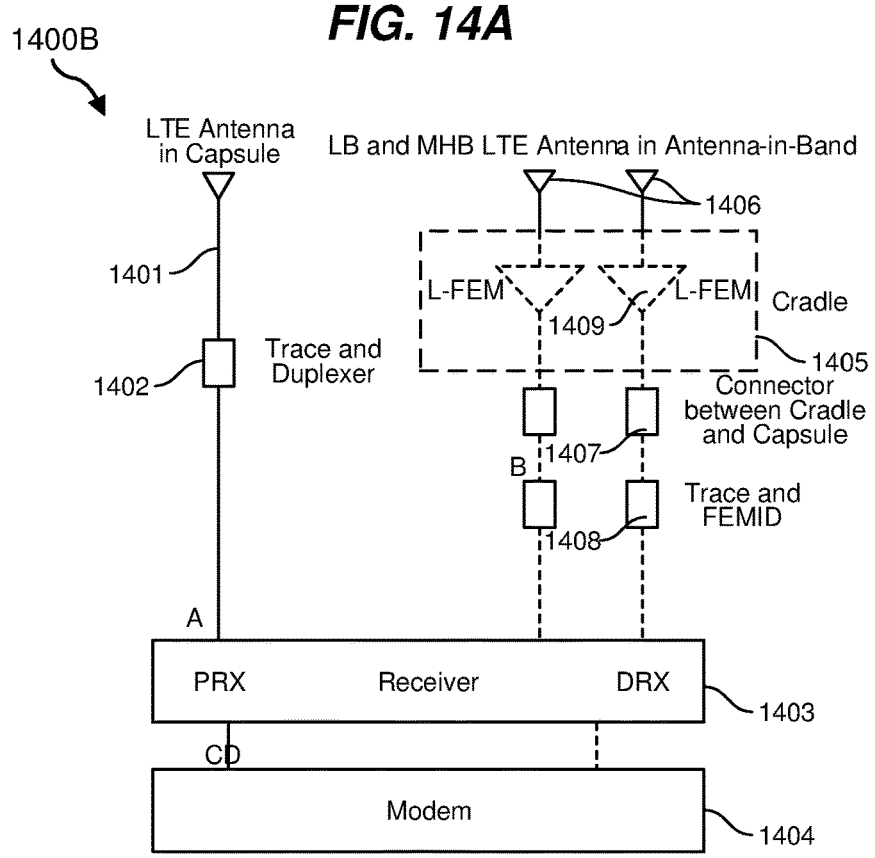

FIG. 14B illustrates an embodiment similar to that of FIG. 14A, and includes an LTE antenna 1401 in a capsule, a duplexer or FEM 1402, a transceiver 1403 and a modem 1404. However, in embodiment 1400B, different low band and high band LTE antennas 1406 may be implemented in the cradle 1405, in addition to the LTE antenna 1401 in the capsule. In such cases, the cradle may be an RF transparent cradle, such as that shown in FIGS. 12A and 12B. The low band and high band LTE antennas 1406 may connect to the transceiver 1403 through a connector 1407 between the cradle and the capsule. This connector 1407 may be similar to connector 1205 of FIG. 12. In some cases, the low band and high band LTE antennas may each be connected to the transceiver 1403 through separate capsule/cradle connectors 1407. At least in some cases, the low band and high band LTE antennas 1406 may be a single antenna.

Figure 14C:
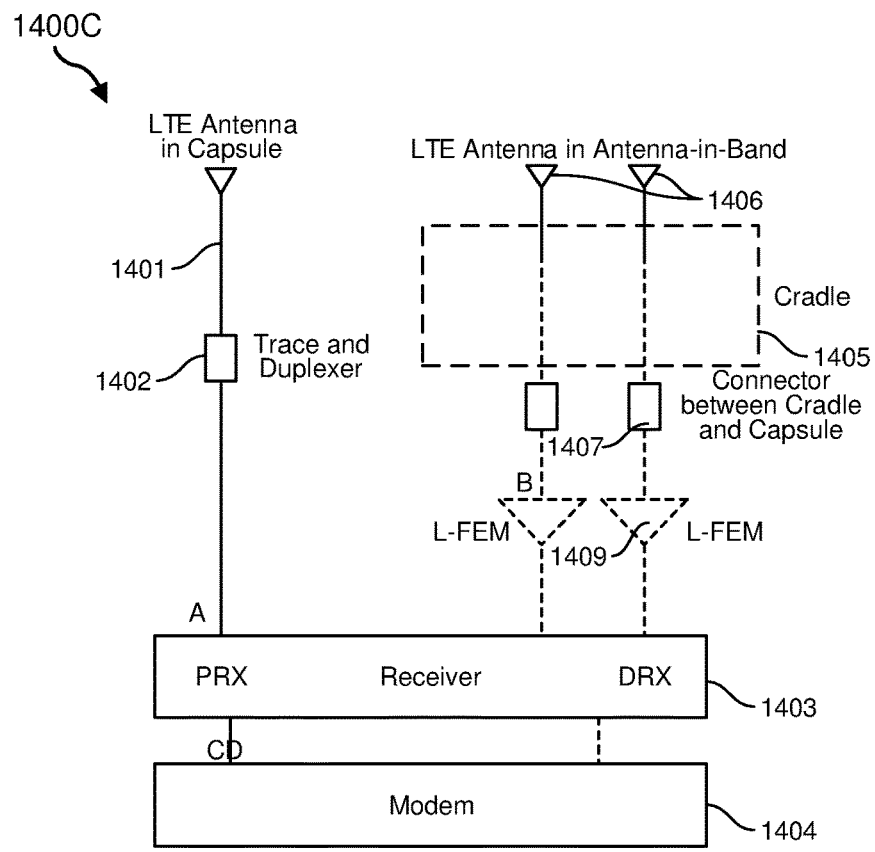

FIG. 14C illustrates an embodiment 1400C that may be similar to those of FIGS. 14A and 14B, and may include an LTE antenna 1401 in a capsule connected to the transceiver 1403 and modem 1404 through a duplexer or FEM 1402. Low and high band LTE antennas 1406 may connect through the cradle 1405 to the capsule using a capsule/cradle connector 1407 (e.g., either a capacitive or a direct, ohmic connector) and respective FEMs 1409. In this embodiment, the FEMs 1409 may be located outside of the cradle 1405. The connector 1407 between the cradle and capsule that lies external to the cradle 1405 may be a cosmetic RF transparent feature, as described above in conjunction with FIGS. 3A-7E.

Figure 14D:
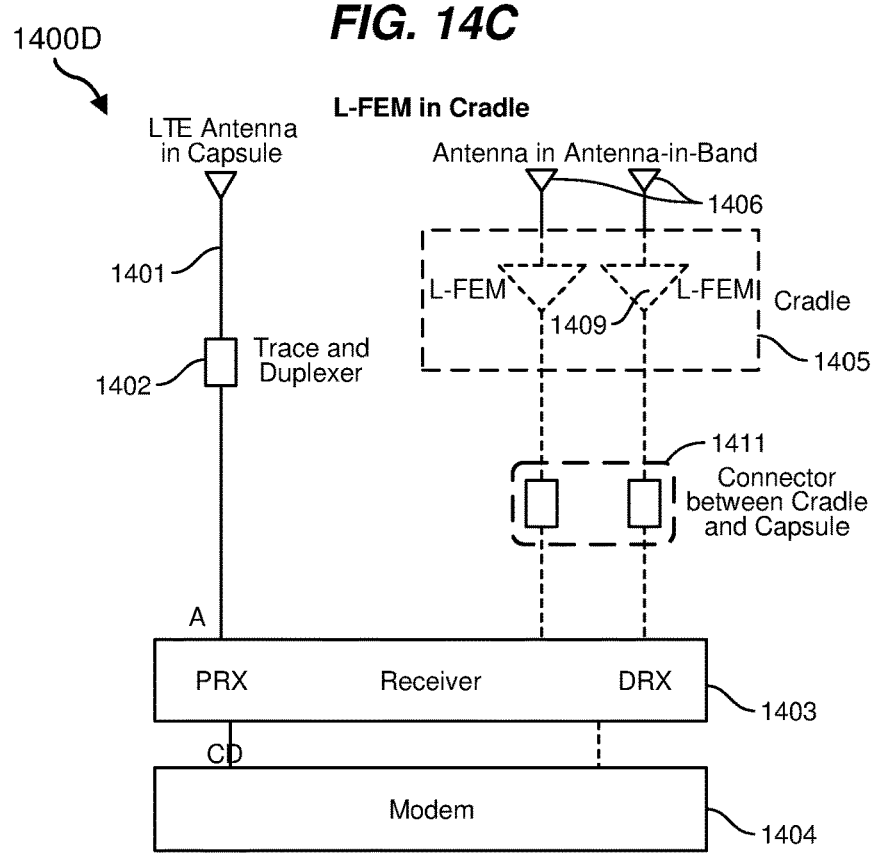

FIG. 14D illustrates an embodiment 1400D that may be similar to the embodiments shown in FIGS. 14A-14C, including an LTE antenna 1401, a duplexer or FEM 1402, a transceiver 1403, and a modem 1404. However, in this embodiment, the antennas 1406 may connect through front end modules (FEM) 1409 in the cradle 1405. In this case, as in FIGS. 10-11C, a direct, ohmic connector 1411 may be used to connect the cradle to the capsule. This connector may be substantially the same as connector 1008 of FIG. 10, or 1107 of FIG. 11. Indeed, this connector may be a 50-Ohm connector, such as a shielded coaxial cable or subminiature version A (SMA) connector, between the cradle's PCB and the capsule's PCB. Such a transmission line may allow the FEM 1409 to remain in the cradle, despite the cradle being metallic. While FIGS. 14A-14D illustrate four examples of antenna architectures, it will be understood that many different architectures may be used with the embodiments described herein.

FIGS. 15A-15D illustrate embodiments of a wristband system that includes a capsule 1500A and a wristband 1500B. The capsule 1500A may include a housing 1501 that secures various components including a PCB, a camera (e.g., accessible through cutout 1503), a battery, and other components. In some cases, the capsule's housing 1501 may include a cutout 1506 for an interconnector between the capsule and the cradle 1500B. The capsule 1500A may have one or more internal contacts 1504 that align with external contacts 1505 on the cradle 1500B. These contacts may be configured to transfer (or receive) signals from the antenna-in-band (AiB) 1507. In some cases, the cradle 1500B may include a metal portion 1520 that is receded to the center. The cradle's perimeter 1521 may be RF transparent, allowing the antenna contacts 1505 to stay outside of the cradle, but still be concealed within the cradle's structure. The recipient contacts 1504 on the capsule 1500A may be located on a bottom portion of the capsule that is RF transparent.

Figure 15A:
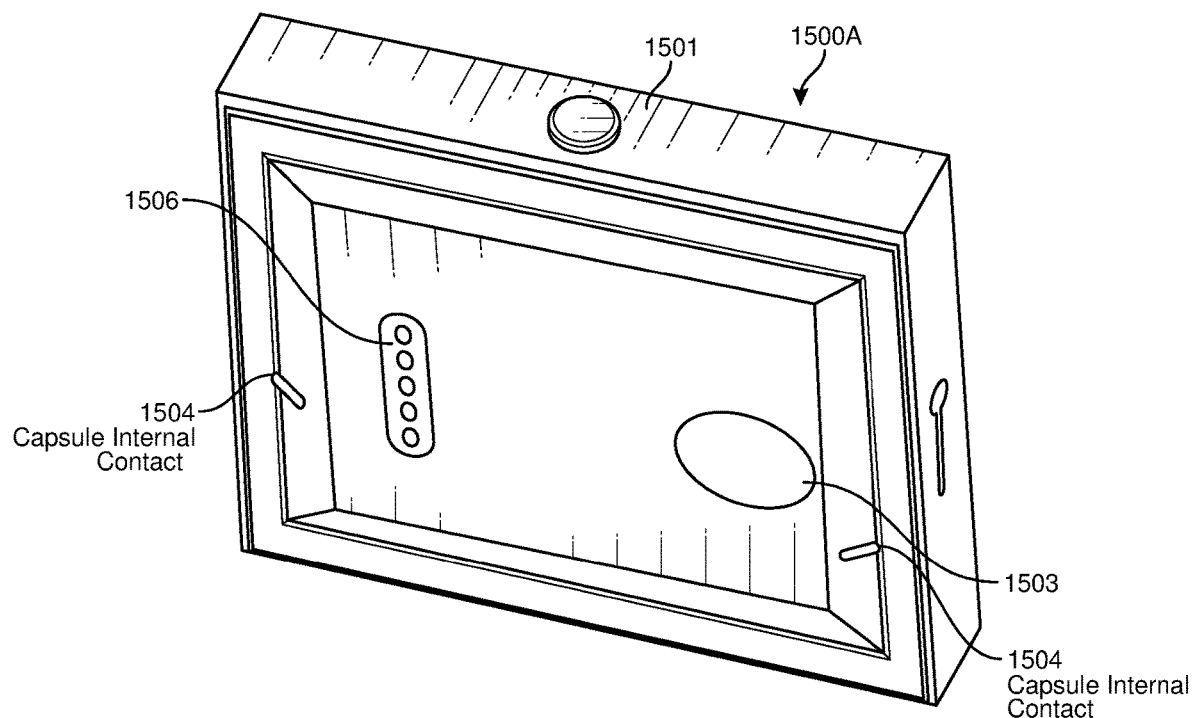
FIGS. 15A-15D illustrate diagrams of an alternative embodiment of an example wristband system, according to at least one embodiment of the present disclosure.
Figure 15B:
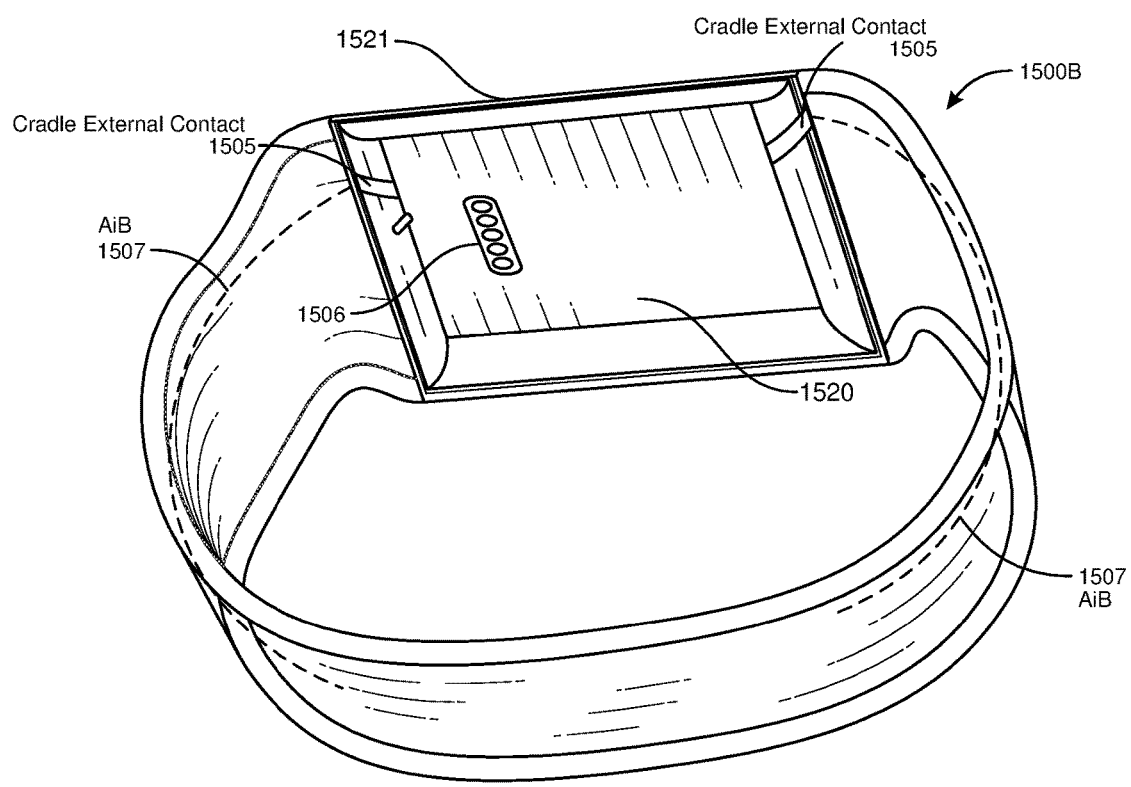
Figure 15C:
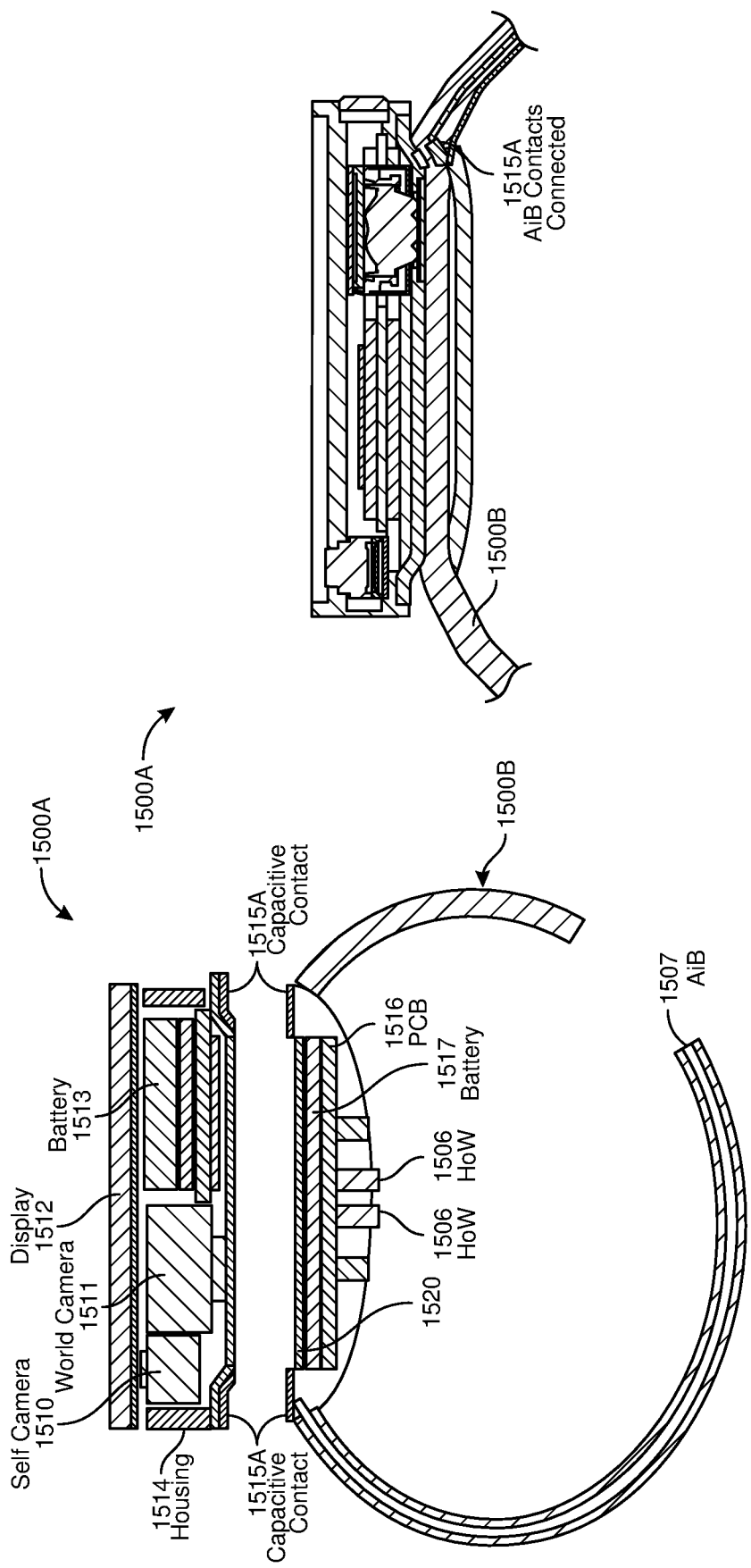

FIG. 15C illustrates a side view of the embodiment shown in FIGS. 15A and 15B. FIG. 15C illustrates an embodiment in which the cradle 1500B is capacitively linked to the capsule 1500A. These capacitive contacts 1515A may be concealed within the outer structure of the cradle. The capacitive contacts 1515A may capacitively couple to the corresponding contacts 1504 on the capsule 1500A, allowing energy to flow from the antenna-in-band 1507 to the various components of the capsule. This capacitive connection may link the components of the cradle (e.g., a heart rate monitor 1506, a battery 1517, a PCB 1516, etc.) to the components of the capsule (e.g., a display 1512, a user-facing camera 1510, a world-facing camera 1511, a battery 1513, etc.). As can be seen, the capacitive contacts 1515A of the cradle and capsule are not touching, allowing for a potentially more imprecise fitting while still transferring a sufficient amount of energy to allow the antennas to function properly. Moreover, a space may exist between the capacitive contacts 1515A and the metal portion 1520 that is recessed and centered on the cradle 1500B. Having this space between the capacitive contacts 1515A and the metal center portion 1520 may allow the capacitive contacts 1515A to stay outside of the metallic cradle, while still being part of the outer structure of the cradle 1500B.

Figure 15D:
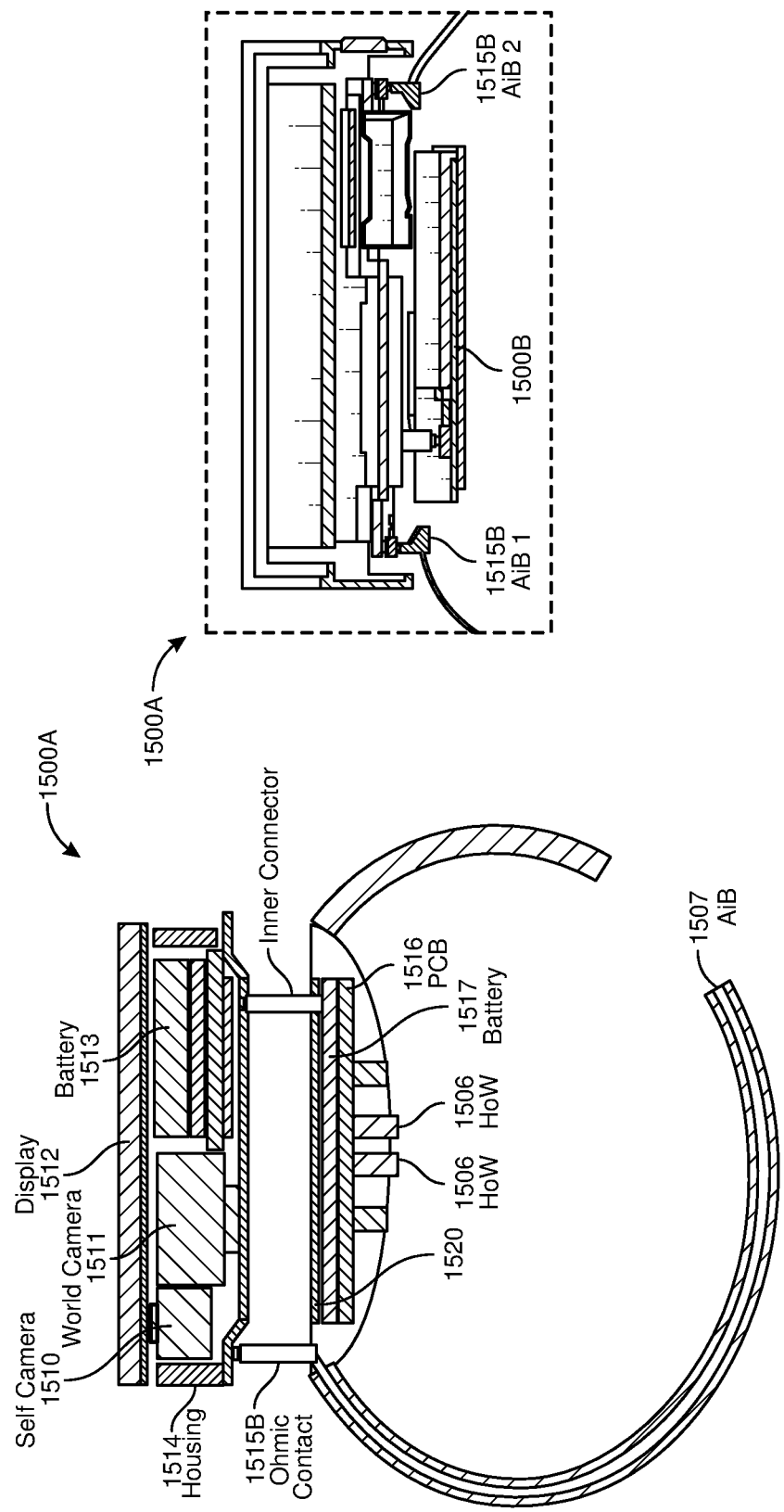

FIG. 15D illustrates a similar embodiment of a side view of the scenario shown in FIGS. 15A and 15B. In this case, however, FIG. 15D illustrates an embodiment in which the cradle 1500B is linked to the capsule 1500A via an ohmic contact 1515B. As above, these ohmic contacts 1515B may be concealed within the outer structure of the cradle 1500B. The ohmic contacts 1515B may directly couple to the corresponding contacts 1504 on the capsule 1500A, allowing energy to flow from the antenna-in-band 1507 to the various components of the capsule. This direct, ohmic connection may thus link the components of the cradle to the components of the capsule. As can be seen in FIG. 15D, a space may exist between the ohmic contacts 1515B and the metal portion 1520 that is recessed and centered on the cradle. As described above, having this space between the ohmic contacts 1515B and the metal center portion 1520 may allow the ohmic contacts 1515B to stay outside of the metallic cradle, while still being part of the outer structure of the cradle.

Figure 16:
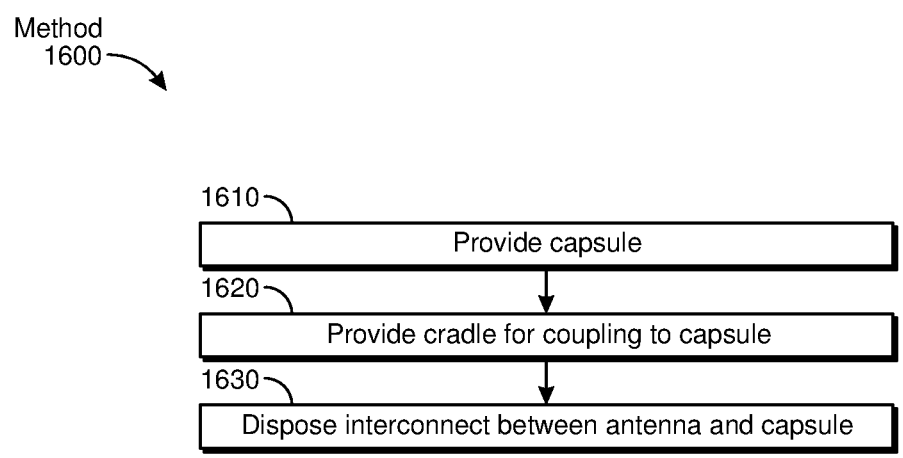
FIG. 16 is a flow diagram of an exemplary method for manufacturing a mobile electronic device.

FIG. 16 is a flow diagram of an exemplary computer-implemented method 1600 for manufacturing a mobile electronic device. The steps shown in FIG. 16 may be performed by any suitable computer-executable code and/or computing system, including the systems described herein. In one example, each of the steps shown in FIG. 16 may represent an algorithm whose structure includes and/or is represented by multiple sub-steps, examples of which will be provided in greater detail below.

As illustrated in FIG. 16, a processor, controller, or other processing unit may be configured to interpret computer-executable code that initiates and controls a manufacturing process. As part of this process, at step 1610, a manufacturing system may provide, produce, or generate a capsule (e.g., capsule 303 of FIG. 3). The capsule may include a PCB and multiple internal electronic components. The capsule 303 may be configured to couple to a cradle 304. Indeed, at step 1620, the method 1600 may include providing, producing, or manufacturing a cradle for coupling to the capsule. The cradle may be conductive or may be RF transparent. The cradle may include its own PCB and associated electronic components. The cradle may attach to the capsule via a direct connection, or via a capacitive (passive) connection. In some cases, as described in step 1630, the manufacturing process may further include disposing an interconnect between an antenna in a wrist strap and the capsule. The interconnect may be a cosmetic RF transparent feature that avoids contact with or travel through the cradle. The interconnect may be a direct, ohmic connection, or may be a capacitive connection, as described above. The interconnect may be coated in an RF transparent coating and may optionally be painted to appear more aesthetically pleasing. In some cases, the manufacturing process may include attaching a second wrist band to the capsule and/or cradle. In such cases, a second cosmetic RF transparent feature may be implemented to link the second wrist band to the capsule and/or to the cradle.

In this manner, various embodiments may be provided that allow a wristband system to implement antennas and/or sensors in wrist straps. The embodiments herein may provide external connections that can transfer RF radiation from wrist strap antennas to capsules without going through the base cradle. Moreover, the embodiments herein may provide capacitive connections that are capable of withstanding repeated couplings and uncouplings. Still further, these embodiments may work with a variety of different antenna technologies, in a variety of different scenarios.

EXAMPLE EMBODIMENTS

Example 1: A system may include a capsule that houses one or more electronic components, a cradle that is configured to removably couple with the capsule, at least one strap connected to at least a first end of the cradle, the strap including at least one antenna, and a radio frequency (RF) transparent interconnect that electrically connects the at least one antenna in the strap to at least one of the electronic components in the capsule.

Example 2: The system of Example 1, wherein the RF transparent interconnect avoids contact with or travel through the cradle.

Example 3: The system of any of Examples 1 and 2, wherein the RF transparent interconnect comprises a capacitive connection between the at least one antenna in the strap and one or more transmission lines in the capsule.

Example 4: The system of any of Examples 1-3, further comprising an impedance matching circuit electrically positioned between the capacitive connection and the one or more transmission lines.

Example 5: The system of any of Examples 1-4, wherein the capacitive connection includes one or more capacitive elements, and wherein the one or more capacitive elements are coated in an RF transparent coating.

Example 6: The system of any of Examples 1-5, wherein the RF transparent interconnect comprises a direct ohmic connection between the at least one antenna in the strap and one or more transmission lines in the capsule.

Example 7: The system of any of Examples 1-6, wherein the at least one strap further includes one or more sensors.

Example 8: The system of any of Examples 1-7, wherein the one or more sensors and the at least one antenna included on the at least one strap share at least a portion of conductive trace material.

Example 9: The system of any of Examples 1-8, wherein the one or more sensors in the strap comprise electromyography (EMG) electrodes.

Example 10: The system of any of Examples 1-9, further comprising a second strap connected to a second, different end of the cradle, the second strap including a second antenna.

Example 11: The system of any of Examples 1-10, wherein the at least one antenna of the at least one strap and the second antenna of the second strap function together to form a dipole antenna.

Example 12: The system of any of Examples 1-11, wherein the cradle is metallic, and wherein one or more transmission lines corresponding to at least one antenna run through at least a portion of the metallic cradle.

Example 13: The system of any of Examples 1-12, further comprising an impedance matching circuit electrically positioned between at least one antenna and the metallic capsule.

Example 14: The system of any of Examples 1-13, wherein the cradle is formed using an RF transparent material, and wherein at least one antenna is electrically connected to one or more transmission lines via a conductive material that runs through at least a portion of the RF transparent cradle.

Example 15: The system of any of Examples 1-14, wherein the conductive material comprises a pogo pin, and wherein the pogo pin is electrically connected to the one or more transmission lines via an impedance matching circuit.

Example 16: The system of any of Examples 1-15, wherein the cradle further includes a printed circuit board (PCB) comprising one or more electronic components.

Example 17: The system of any of Examples 1-16, wherein the one or more electronic components of the PCB on the cradle are electrically connected to the electronic components of the capsule upon coupling the capsule to the cradle.

Example 18: The system of any of Examples 1-17, wherein the at least one strap is interchangeable with a second strap, and wherein the second strap includes a different antenna than that included in the at least one strap.

Example 19: A mobile electronic device may include a capsule that houses one or more electronic components disposed on a printed circuit board (PCB), a cradle that is configured to removably couple with the capsule, and at least one strap connected to at least a first end of the cradle, the strap including at least one antenna, wherein the cradle is metallic, and wherein one or more transmission lines corresponding to at least one antenna run through at least a portion of the metallic cradle to the PCB via an impedance-matched connection.

Example 20: A mobile electronic device may include a capsule that houses one or more electronic components disposed on a printed circuit board (PCB), a cradle that is configured to removably couple with the capsule, and at least one strap connected to at least a first end of the cradle, the strap including at least one antenna, wherein the cradle is formed using an RF transparent material, and wherein at least one antenna is electrically connected to one or more transmission lines via a conductive material that runs through at least a portion of the RF transparent cradle to the PCB via an impedance-matched connection.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1700 in FIG. 17) or that visually immerses a user in an artificial reality (such as, e.g., virtual-reality system 1800 in FIG. 18). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 17:
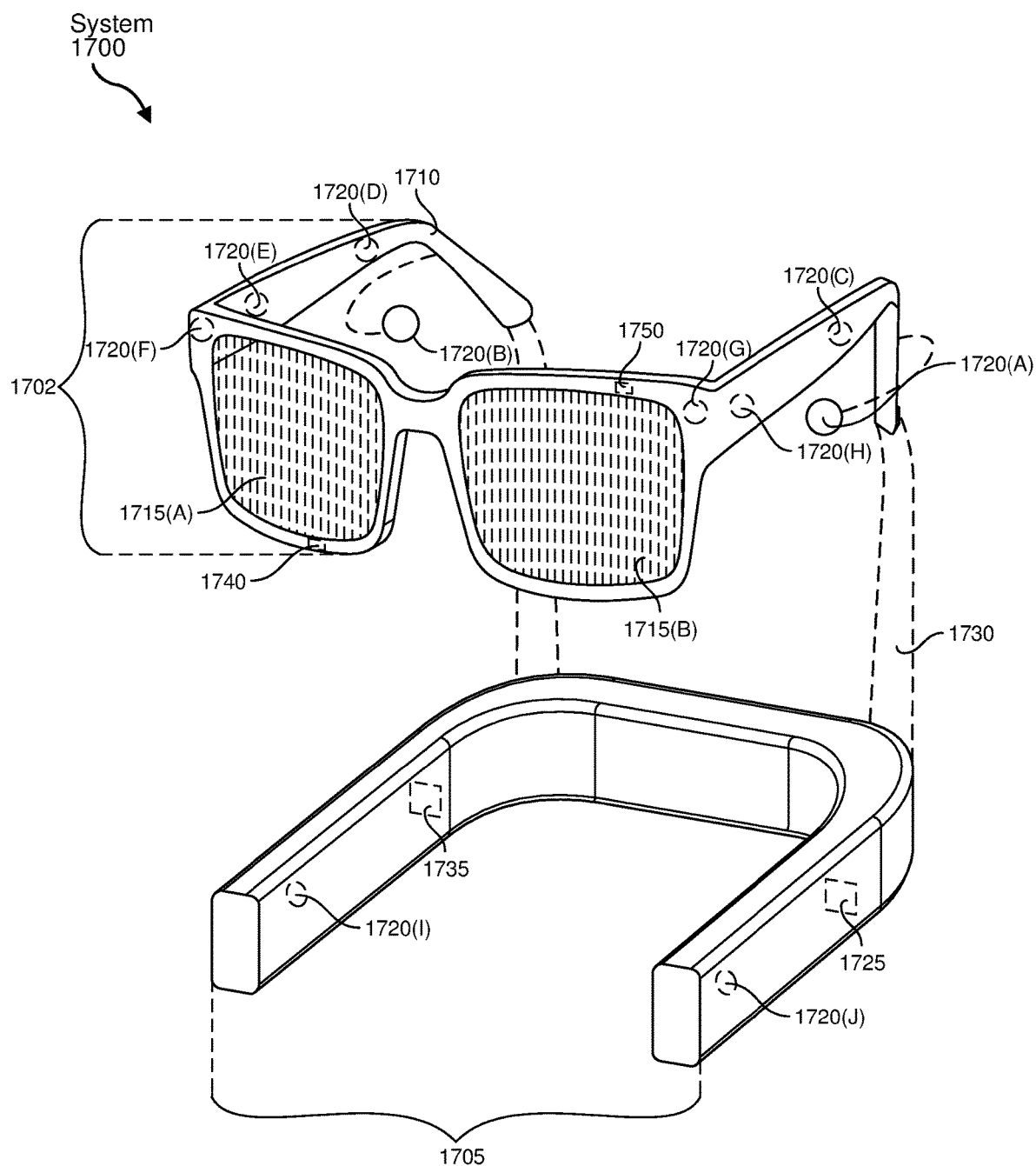
FIG. 17 is an illustration of exemplary augmented-reality glasses that may be used in connection with embodiments of this disclosure.

Turning to FIG. 17, augmented-reality system 1700 may include an eyewear device 1702 with a frame 1710 configured to hold a left display device 1715(A) and a right display device 1715(B) in front of a user's eyes. Display devices 1715(A) and 1715(B) may act together or independently to present an image or series of images to a user. While augmented-reality system 1700 includes two displays, embodiments of this disclosure may be implemented in augmented-reality systems with a single NED or more than two NEDs.

In some embodiments, augmented-reality system 1700 may include one or more sensors, such as sensor 1740. Sensor 1740 may generate measurement signals in response to motion of augmented-reality system 1700 and may be located on substantially any portion of frame 1710. Sensor 1740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1700 may or may not include sensor 1740 or may include more than one sensor. In embodiments in which sensor 1740 includes an IMU, the IMU may generate calibration data based on measurement signals from sensor 1740. Examples of sensor 1740 may include, without limitation, accelerometers, gyroscopes, magnetometers, other suitable types of sensors that detect motion, sensors used for error correction of the IMU, or some combination thereof.

In some examples, augmented-reality system 1700 may also include a microphone array with a plurality of acoustic transducers 1720(A)-1720(J), referred to collectively as acoustic transducers 1720. Acoustic transducers 1720 may represent transducers that detect air pressure variations induced by sound waves. Each acoustic transducer 1720 may be configured to detect sound and convert the detected sound into an electronic format (e.g., an analog or digital format). The microphone array in FIG. 17 may include, for example, ten acoustic transducers: 1720(A) and 1720(B), which may be designed to be placed inside a corresponding ear of the user, acoustic transducers 1720(C), 1720(D), 1720(E), 1720(F), 1720(G), and 1720(H), which may be positioned at various locations on frame 1710, and/or acoustic transducers 1720(1) and 1720(J), which may be positioned on a corresponding neckband 1705.

In some embodiments, one or more of acoustic transducers 1720(A)-(J) may be used as output transducers (e.g., speakers). For example, acoustic transducers 1720(A) and/or 1720(B) may be earbuds or any other suitable type of headphone or speaker.

The configuration of acoustic transducers 1720 of the microphone array may vary. While augmented-reality system 1700 is shown in FIG. 17 as having ten acoustic transducers 1720, the number of acoustic transducers 1720 may be greater or less than ten. In some embodiments, using higher numbers of acoustic transducers 1720 may increase the amount of audio information collected and/or the sensitivity and accuracy of the audio information. In contrast, using a lower number of acoustic transducers 1720 may decrease the computing power required by an associated controller 1750 to process the collected audio information. In addition, the position of each acoustic transducer 1720 of the microphone array may vary. For example, the position of an acoustic transducer 1720 may include a defined position on the user, a defined coordinate on frame 1710, an orientation associated with each acoustic transducer 1720, or some combination thereof.

Acoustic transducers 1720(A) and 1720(B) may be positioned on different parts of the user's ear, such as behind the pinna, behind the tragus, and/or within the auricle or fossa. Or, there may be additional acoustic transducers 1720 on or surrounding the ear in addition to acoustic transducers 1720 inside the ear canal. Having an acoustic transducer 1720 positioned next to an ear canal of a user may enable the microphone array to collect information on how sounds arrive at the ear canal. By positioning at least two of acoustic transducers 1720 on either side of a user's head (e.g., as binaural microphones), augmented-reality device 1700 may simulate binaural hearing and capture a 3D stereo sound field around about a user's head. In some embodiments, acoustic transducers 1720(A) and 1720(B) may be connected to augmented-reality system 1700 via a wired connection 1730, and in other embodiments acoustic transducers 1720(A) and 1720(B) may be connected to augmented-reality system 1700 via a wireless connection (e.g., a BLUETOOTH connection). In still other embodiments, acoustic transducers 1720(A) and 1720(B) may not be used at all in conjunction with augmented-reality system 1700.

Acoustic transducers 1720 on frame 1710 may be positioned in a variety of different ways, including along the length of the temples, across the bridge, above or below display devices 1715(A) and 1715(B), or some combination thereof. Acoustic transducers 1720 may also be oriented such that the microphone array is able to detect sounds in a wide range of directions surrounding the user wearing the augmented-reality system 1700. In some embodiments, an optimization process may be performed during manufacturing of augmented-reality system 1700 to determine relative positioning of each acoustic transducer 1720 in the microphone array.

In some examples, augmented-reality system 1700 may include or be connected to an external device (e.g., a paired device), such as neckband 1705. Neckband 1705 generally represents any type or form of paired device. Thus, the following discussion of neckband 1705 may also apply to various other paired devices, such as charging cases, smart watches, smart phones, wrist bands, other wearable devices, hand-held controllers, tablet computers, laptop computers, other external compute devices, etc.

As shown, neckband 1705 may be coupled to eyewear device 1702 via one or more connectors. The connectors may be wired or wireless and may include electrical and/or non-electrical (e.g., structural) components. In some cases, eyewear device 1702 and neckband 1705 may operate independently without any wired or wireless connection between them. While FIG. 17 illustrates the components of eyewear device 1702 and neckband 1705 in example locations on eyewear device 1702 and neckband 1705, the components may be located elsewhere and/or distributed differently on eyewear device 1702 and/or neckband 1705. In some embodiments, the components of eyewear device 1702 and neckband 1705 may be located on one or more additional peripheral devices paired with eyewear device 1702, neckband 1705, or some combination thereof.

Pairing external devices, such as neckband 1705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1700 may be provided by a paired device or shared between a paired device and an eyewear device, thus reducing the weight, heat profile, and form factor of the eyewear device overall while still retaining desired functionality. For example, neckband 1705 may allow components that would otherwise be included on an eyewear device to be included in neckband 1705 since users may tolerate a heavier weight load on their shoulders than they would tolerate on their heads. Neckband 1705 may also have a larger surface area over which to diffuse and disperse heat to the ambient environment. Thus, neckband 1705 may allow for greater battery and computation capacity than might otherwise have been possible on a stand-alone eyewear device. Since weight carried in neckband 1705 may be less invasive to a user than weight carried in eyewear device 1702, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1705 may be communicatively coupled with eyewear device 1702 and/or to other devices. These other devices may provide certain functions (e.g., tracking, localizing, depth mapping, processing, storage, etc.) to augmented-reality system 1700. In the embodiment of FIG. 17, neckband 1705 may include two acoustic transducers (e.g., 1720(1) and 1720(J)) that are part of the microphone array (or potentially form their own microphone subarray). Neckband 1705 may also include a controller 1725 and a power source 1735.

Acoustic transducers 1720(1) and 1720(J) of neckband 1705 may be configured to detect sound and convert the detected sound into an electronic format (analog or digital). In the embodiment of FIG. 17, acoustic transducers 1720(1) and 1720(J) may be positioned on neckband 1705, thereby increasing the distance between the neckband acoustic transducers 1720(1) and 1720(J) and other acoustic transducers 1720 positioned on eyewear device 1702. In some cases, increasing the distance between acoustic transducers 1720 of the microphone array may improve the accuracy of beamforming performed via the microphone array. For example, if a sound is detected by acoustic transducers 1720(C) and 1720(D) and the distance between acoustic transducers 1720(C) and 1720(D) is greater than, e.g., the distance between acoustic transducers 1720(D) and 1720(E), the determined source location of the detected sound may be more accurate than if the sound had been detected by acoustic transducers 1720(D) and 1720(E).

Controller 1725 of neckband 1705 may process information generated by the sensors on neckband 1705 and/or augmented-reality system 1700. For example, controller 1725 may process information from the microphone array that describes sounds detected by the microphone array. For each detected sound, controller 1725 may perform a direction-of-arrival (DOA) estimation to estimate a direction from which the detected sound arrived at the microphone array. As the microphone array detects sounds, controller 1725 may populate an audio data set with the information. In embodiments in which augmented-reality system 1700 includes an inertial measurement unit, controller 1725 may compute all inertial and spatial calculations from the IMU located on eyewear device 1702. A connector may convey information between augmented-reality system 1700 and neckband 1705 and between augmented-reality system 1700 and controller 1725. The information may be in the form of optical data, electrical data, wireless data, or any other transmittable data form. Moving the processing of information generated by augmented-reality system 1700 to neckband 1705 may reduce weight and heat in eyewear device 1702, making it more comfortable to the user.

Power source 1735 in neckband 1705 may provide power to eyewear device 1702 and/or to neckband 1705. Power source 1735 may include, without limitation, lithium ion batteries, lithium-polymer batteries, primary lithium batteries, alkaline batteries, or any other form of power storage. In some cases, power source 1735 may be a wired power source. Including power source 1735 on neckband 1705 instead of on eyewear device 1702 may help better distribute the weight and heat generated by power source 1735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1800 in FIG. 18, that mostly or completely covers a user's field of view. Virtual-reality system 1800 may include a front rigid body 1802 and a band 1804 shaped to fit around a user's head. Virtual-reality system 1800 may also include output audio transducers 1806(A) and 1806(B). Furthermore, while not shown in FIG. 18, front rigid body 1802 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1700 and/or virtual-reality system 1800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1700 and/or virtual-reality system 1800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1700 and/or virtual-reality system 1800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1700 and 1800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 19:
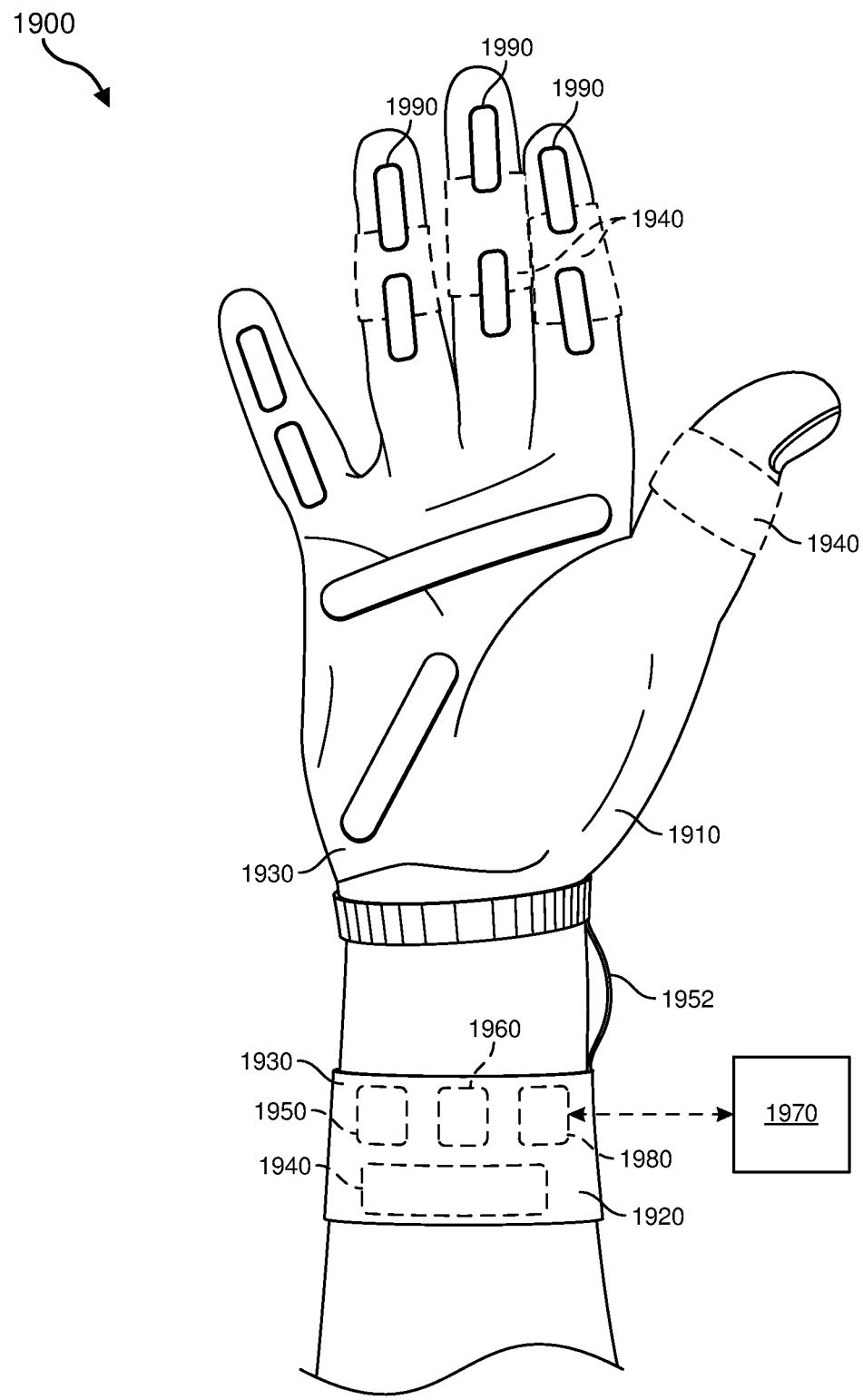
FIG. 19 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 19 illustrates a vibrotactile system 1900 in the form of a wearable glove (haptic device 1910) and wristband (haptic device 1920). Haptic device 1910 and haptic device 1920 are shown as examples of wearable devices that include a flexible, wearable textile material 1930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1940 may be positioned at least partially within one or more corresponding pockets formed in textile material 1930 of vibrotactile system 1900. Vibrotactile devices 1940 may be positioned in locations to provide a vibrating sensation (e.g., haptic feedback) to a user of vibrotactile system 1900. For example, vibrotactile devices 1940 may be positioned against the user's finger(s), thumb, or wrist, as shown in FIG. 19. Vibrotactile devices 1940 may, in some examples, be sufficiently flexible to conform to or bend with the user's corresponding body part(s).

A power source 1950 (e.g., a battery) for applying a voltage to the vibrotactile devices 1940 for activation thereof may be electrically coupled to vibrotactile devices 1940, such as via conductive wiring 1952. In some examples, each of vibrotactile devices 1940 may be independently electrically coupled to power source 1950 for individual activation. In some embodiments, a processor 1960 may be operatively coupled to power source 1950 and configured (e.g., programmed) to control activation of vibrotactile devices 1940.

Vibrotactile system 1900 may be implemented in a variety of ways. In some examples, vibrotactile system 1900 may be a standalone system with integral subsystems and components for operation independent of other devices and systems. As another example, vibrotactile system 1900 may be configured for interaction with another device or system 1970. For example, vibrotactile system 1900 may, in some examples, include a communications interface 1980 for receiving and/or sending signals to the other device or system 1970. The other device or system 1970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1980 may enable communications between vibrotactile system 1900 and the other device or system 1970 via a wireless (e.g., Wi-Fi, BLUETOOTH, cellular, radio, etc.) link or a wired link. If present, communications interface 1980 may be in communication with processor 1960, such as to provide a signal to processor 1960 to activate or deactivate one or more of the vibrotactile devices 1940.

Vibrotactile system 1900 may optionally include other subsystems and components, such as touch-sensitive pads 1990, pressure sensors, motion sensors, position sensors, lighting elements, and/or user interface elements (e.g., an on/off button, a vibration control element, etc.). During use, vibrotactile devices 1940 may be configured to be activated for a variety of different reasons, such as in response to the user's interaction with user interface elements, a signal from the motion or position sensors, a signal from the touch-sensitive pads 1990, a signal from the pressure sensors, a signal from the other device or system 1970, etc.

Although power source 1950, processor 1960, and communications interface 1980 are illustrated in FIG. 19 as being positioned in haptic device 1920, the present disclosure is not so limited. For example, one or more of power source 1950, processor 1960, or communications interface 1980 may be positioned within haptic device 1910 or within another wearable textile.

Figure 20:
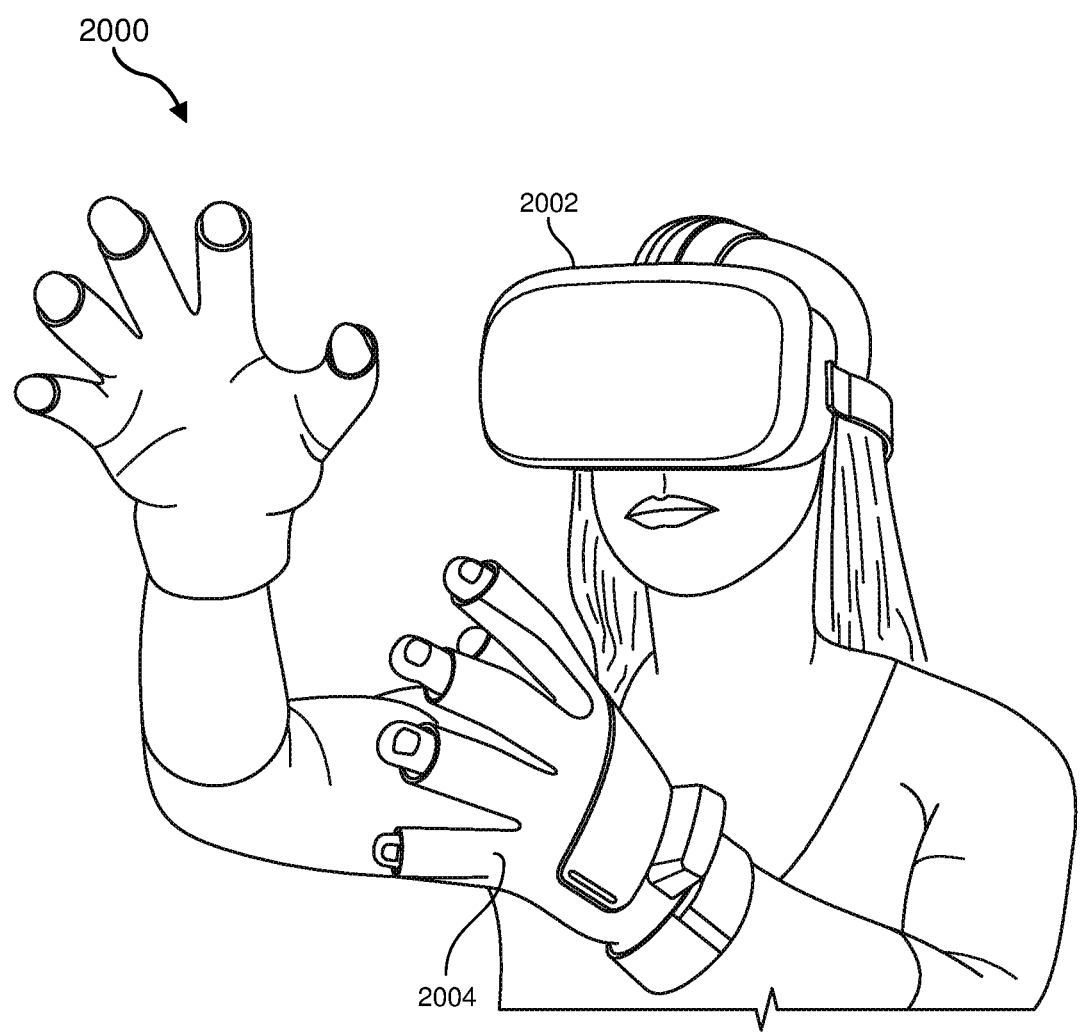
FIG. 20 is an illustration of an exemplary virtual-reality environment according to embodiments of this disclosure.

Haptic wearables, such as those shown in and described in connection with FIG. 19, may be implemented in a variety of types of artificial-reality systems and environments. FIG. 20 shows an example artificial-reality environment 2000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 18:
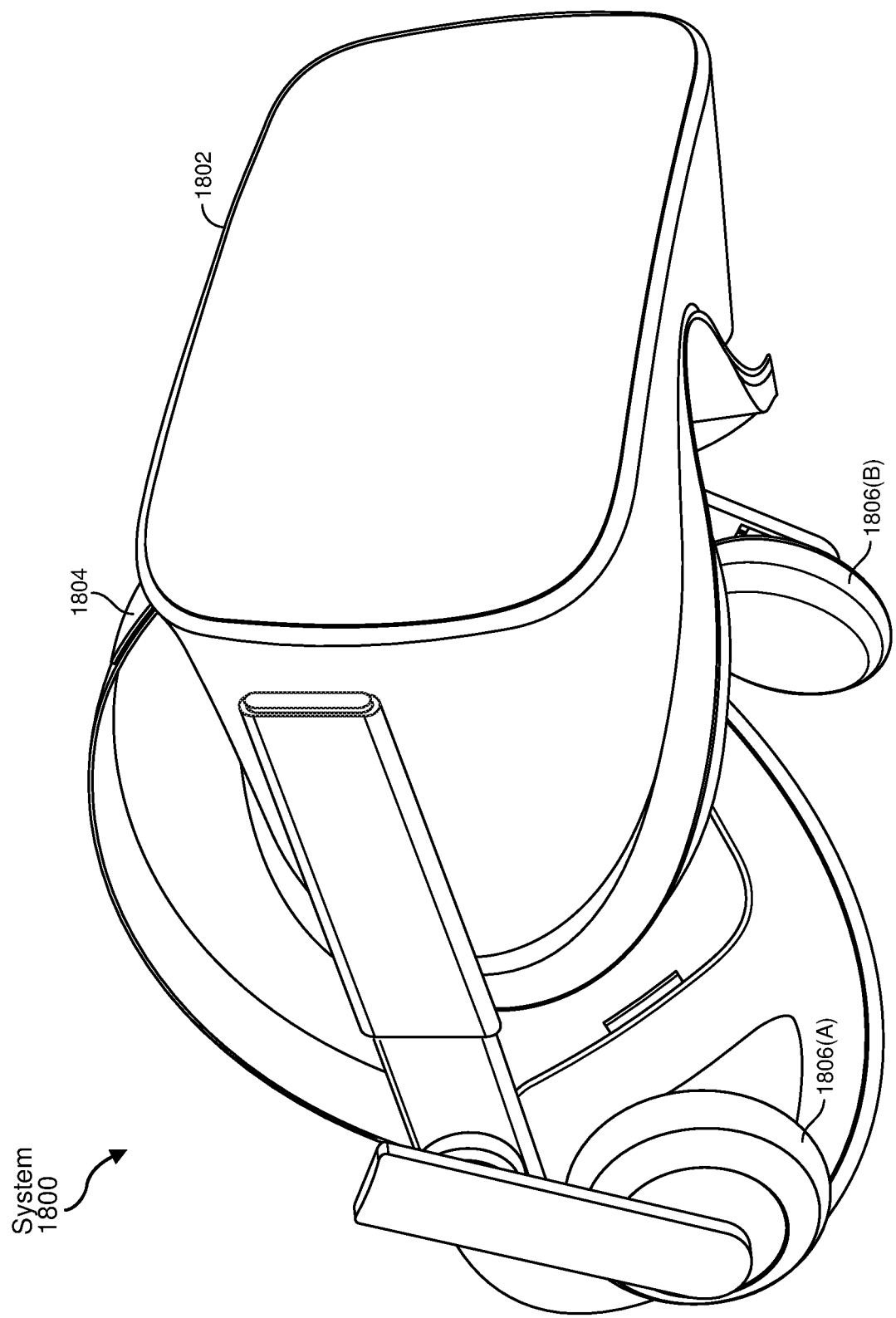
FIG. 18 is an illustration of an exemplary virtual-reality headset that may be used in connection with embodiments of this disclosure.

Head-mounted display 2002 generally represents any type or form of virtual-reality system, such as virtual-reality system 1800 in FIG. 18. Haptic device 2004 generally represents any type or form of wearable device, worn by a user of an artificial-reality system, that provides haptic feedback to the user to give the user the perception that he or she is physically engaging with a virtual object. In some embodiments, haptic device 2004 may provide haptic feedback by applying vibration, motion, and/or force to the user. For example, haptic device 2004 may limit or augment a user's movement. To give a specific example, haptic device 2004 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2004 to send action requests to a console. Examples of action requests include, without limitation, requests to start an application and/or end the application and/or requests to perform a particular action within the application.

Figure 21:
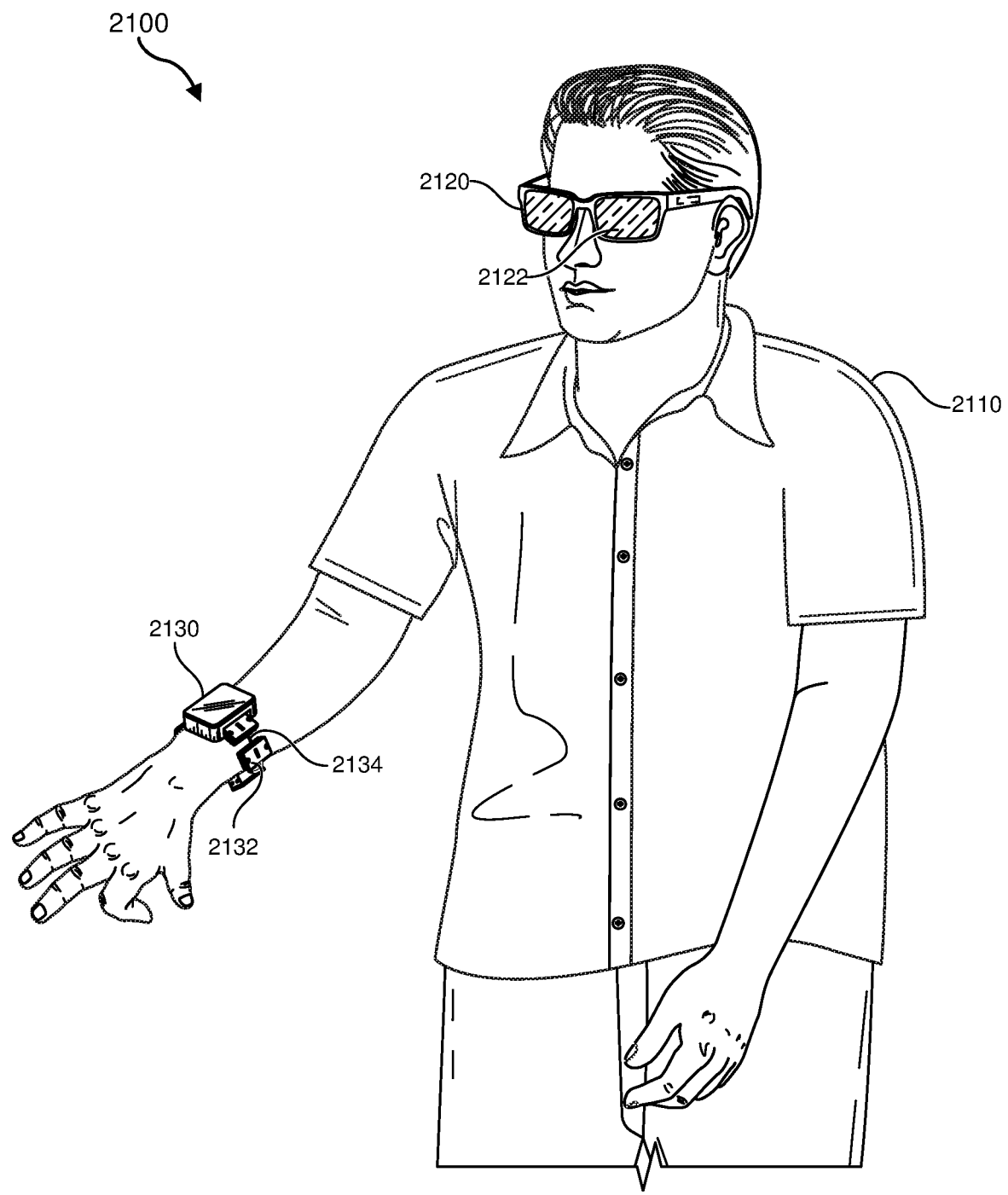
FIG. 21 is an illustration of an exemplary augmented-reality environment according to embodiments of this disclosure.

While haptic interfaces may be used with virtual-reality systems, as shown in FIG. 20, haptic interfaces may also be used with augmented-reality systems, 2100 as shown in FIG. 21. FIG. 21 is a perspective view of a user 2110 interacting with an augmented-reality system 2100. In this example, user 2110 may wear a pair of augmented-reality glasses 2120 that may have one or more displays 2122 and that are paired with a haptic device 2130. In this example, haptic device 2130 may be a wristband that includes a plurality of band elements 2132 and a tensioning mechanism 2134 that connects band elements 2132 to one another.

One or more of band elements 2132 may include any type or form of actuator suitable for providing haptic feedback. For example, one or more of band elements 2132 may be configured to provide one or more of various types of cutaneous feedback, including vibration, force, traction, texture, and/or temperature. To provide such feedback, band elements 2132 may include one or more of various types of actuators. In one example, each of band elements 2132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1910, 1920, 2004, and 2130 may include any suitable number and/or type of haptic transducer, sensor, and/or feedback mechanism. For example, haptic devices 1910, 1920, 2004, and 2130 may include one or more mechanical transducers, piezoelectric transducers, and/or fluidic transducers. Haptic devices 1910, 1920, 2004, and 2130 may also include various combinations of different types and forms of transducers that work together or independently to enhance a user's artificial-reality experience. In one example, each of band elements 2132 of haptic device 2130 may include a vibrotactor (e.g., a vibrotactile actuator) configured to vibrate in unison or independently to provide one or more of various types of haptic sensations to a user.

Figure 22A:
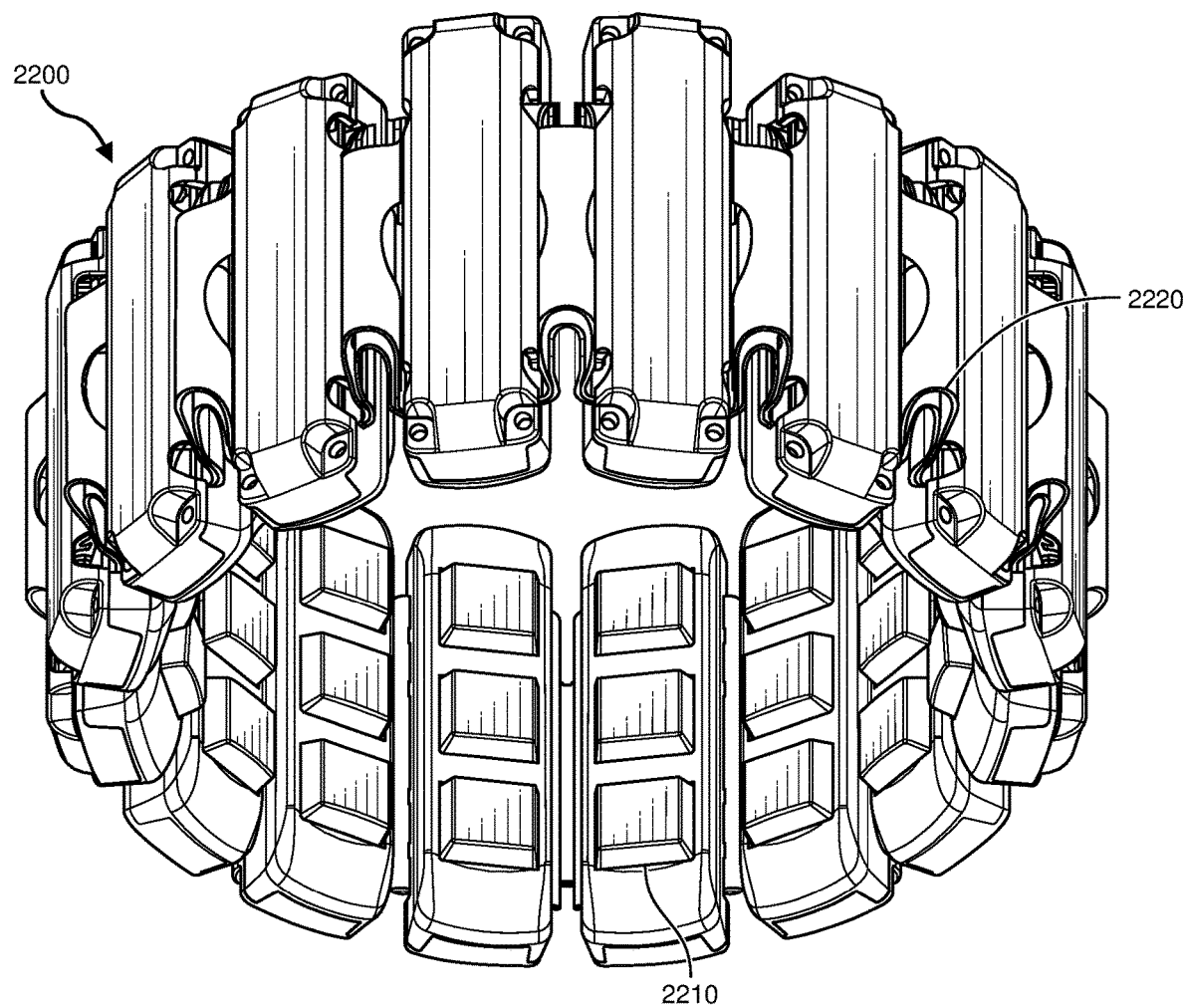
FIGS. 22A and 22B are illustrations of an exemplary human-machine interface configured to be worn around a user's lower arm or wrist.
Figure 22B:
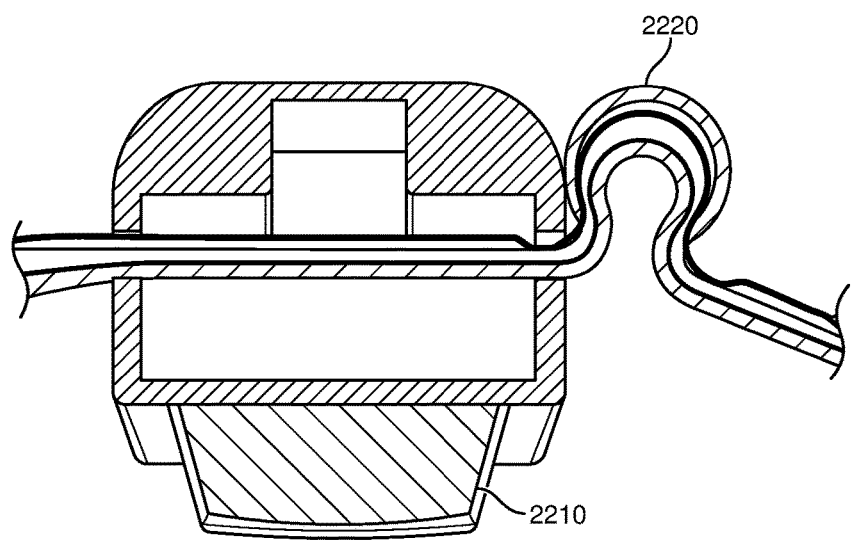

FIG. 22A illustrates an exemplary human-machine interface (also referred to herein as an EMG control interface) configured to be worn around a user's lower arm or wrist as a wearable system 2200. In this example, wearable system 2200 may include sixteen neuromuscular sensors 2210 (e.g., EMG sensors) arranged circumferentially around an elastic band 2220 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 22B illustrates a cross-sectional view through one of the sensors of the wearable device shown in FIG. 22A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 2210 is discussed in more detail below with reference to FIGS. 23A and 23B.

FIGS. 23A and 23B illustrate an exemplary schematic diagram with internal components of a wearable system with EMG sensors. As shown, the wearable system may include a wearable portion 2310 (FIG. 23A) and a dongle portion 2320 (FIG. 23B) in communication with the wearable portion 2310 (e.g., via BLUETOOTH or another suitable wireless communication technology). As shown in FIG. 23A, the wearable portion 2310 may include skin contact electrodes 2311, examples of which are described in connection with FIGS. 22A and 22B. The output of the skin contact electrodes 2311 may be provided to analog front end 2330, which may be configured to perform analog processing (e.g., amplification, noise reduction, filtering, etc.) on the recorded signals. The processed analog signals may then be provided to analog-to-digital converter 2332, which may convert the analog signals to digital signals that can be processed by one or more computer processors. An example of a computer processor that may be used in accordance with some embodiments is microcontroller (MCU) 2334, illustrated in FIG. 23A. As shown, MCU 2334 may also include inputs from other sensors (e.g., IMU sensor 2340), and power and battery module 2342. The output of the processing performed by MCU 2334 may be provided to antenna 2350 for transmission to dongle portion 2320 shown in FIG. 23B.

Dongle portion 2320 may include antenna 2352, which may be configured to communicate with antenna 2350 included as part of wearable portion 2310. Communication between antennas 2350 and 2352 may occur using any suitable wireless technology and protocol, non-limiting examples of which include radiofrequency signaling and BLUETOOTH. As shown, the signals received by antenna 2352 of dongle portion 2320 may be provided to a host computer for further processing, display, and/or for effecting control of a particular physical or virtual object or objects.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a removable capsule that houses one or more electronic components;
   a cradle that is configured to removably couple and uncouple with the removable capsule via a movement that includes at least one of a twist, a turn, or a rotation of the removable capsule;
   at least one strap connected to at least a first end of the cradle, the strap including at least one antenna electrically coupled with a first end of a capacitive connector; and
   a radio frequency (RF) transparent interconnect on the removable capsule, the RF transparent interconnect comprising an RF transparent opening through which the first end of the capacitive connector of at least one antenna in the strap forms a capacitive connection with a second end of the capacitive connector located within the removable capsule in response to the cradle being coupled with the capsule via the movement, wherein the second end is electrically connected with at least one of the electronic components within the removable capsule.

2. The system of claim 1, wherein the RF transparent interconnect avoids contact with or travel through the cradle.

3. The system of claim 1, wherein the capacitive connection via the RF transparent interconnect is established through an RF transparent material of the RF transparent interconnect that is configured to allow transmission of or reception of RF electromagnetic signals between the first end of the capacitive connector and the second end of the capacitive connector.

4. The system of claim 3, further comprising an impedance matching circuit electrically positioned between the second end of the capacitive connection and one or more transmission lines to the one or more electronic components.

5. The system of claim 3, wherein the capacitive connection includes one or more capacitive elements, and wherein the one or more capacitive elements are coated in an RF transparent coating, and wherein the cradle is configured to removably couple and uncouple with the removable capsule via an aligning mechanism that includes one of a pin or a magnet to align the first end of the capacitive connection with the second end of the capacitive connection responsive to the movement.

6. The system of claim 1, wherein the at least one strap further includes one or more sensors.

7. The system of claim 6, wherein the one or more sensors and the at least one antenna included on the at least one strap share at least a portion of conductive trace material.

8. The system of claim 6, wherein the one or more sensors in the strap comprise electromyography (EMG) electrodes.

9. The system of claim 1, further comprising a second strap connected to a second, different end of the cradle, the second strap including a second antenna.

10. The system of claim 9, wherein the at least one antenna of the at least one strap and the second antenna of the second strap function together to form a dipole antenna.

11. The system of claim 1, wherein the cradle further includes a printed circuit board (PCB) comprising one or more electronic components.

12. The system of claim 11, wherein the one or more electronic components of the PCB on the cradle are electrically connected to the electronic components of the capsule upon coupling the capsule to the cradle.

13. The system of claim 1, wherein the at least one strap is interchangeable with a second strap, and wherein the second strap includes a different antenna than that included in the at least one strap.

* * * * *